United States Patent
Kim et al.

(10) Patent No.: US 9,888,478 B2
(45) Date of Patent: Feb. 6, 2018

(54) METHOD AND APPARATUS FOR REPORTING PERFORMANCE OF TERMINAL IN MOBILE COMMUNICATION SYSTEM

(71) Applicant: Samsung Electronics Co., Ltd., Gyeonggi-do (KR)

(72) Inventors: Soeng Hun Kim, Gyeonggi-do (KR); Gert Jan Van Lieshout, Middlesex (GB); Kyeong In Jeong, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/434,380

(22) PCT Filed: Oct. 8, 2013

(86) PCT No.: PCT/KR2013/009010
§ 371 (c)(1),
(2) Date: Apr. 8, 2015

(87) PCT Pub. No.: WO2014/058222
PCT Pub. Date: Apr. 17, 2014

(65) Prior Publication Data
US 2015/0271806 A1    Sep. 24, 2015

(30) Foreign Application Priority Data

Oct. 8, 2012  (KR) .................. 10-2012-0111458
Nov. 5, 2012  (KR) .................. 10-2012-0124355
(Continued)

(51) Int. Cl.
*H04W 24/10* (2009.01)
*H04W 56/00* (2009.01)
(Continued)

(52) U.S. Cl.
CPC ......... *H04W 72/048* (2013.01); *H04L 5/0007* (2013.01); *H04W 24/10* (2013.01);
(Continued)

(58) Field of Classification Search
CPC ............. H04W 24/10; H04W 56/0005; H04W 56/0045; H04W 72/0413; H04W 72/048; H04W 88/02; H04W 88/10; H04L 5/0007
(Continued)

(56) References Cited

U.S. PATENT DOCUMENTS 8,837,304 B2 * 9/2014 Yamada ................ H04L 1/0618
370/241
2006/0280142 A1  12/2006 Darnnjariovic et al.
(Continued)

FOREIGN PATENT DOCUMENTS

CN  101388722 A    3/2009
CN  102291711      12/2011
(Continued)

OTHER PUBLICATIONS

International Search Report dated Jan. 29, 2014 in connection with International Patent Application No. PCT/KR2013/009020, 6 pages.
(Continued)

*Primary Examiner* — Michael Mapa

(57) ABSTRACT

According to one embodiment of the present specification, a method for reporting performance of a terminal in a mobile communication system includes the steps of: receiving a request for performance reporting from a base station; determining an indicator of whether a delay time related operation that the terminal supports is in correspondence with the request which corresponds to a pre-set condition; and transmitting a message including the determined indicator to the base station. According to one aspect of the present specification, the size of the performance reporting (Continued)

message is minimized in reporting the performance of the terminal.

8 Claims, 23 Drawing Sheets

(30) Foreign Application Priority Data

Nov. 13, 2012 (KR) .................. 10-2012-0128393
Apr. 5, 2013 (KR) .................. 10-2013-0037676

(51) Int. Cl.
| | | |
|---|---|---|
| *H04W 72/04* | (2009.01) | |
| *H04W 88/02* | (2009.01) | |
| *H04W 88/10* | (2009.01) | |
| *H04L 5/00* | (2006.01) | |

(52) U.S. Cl.
CPC ... *H04W 56/0005* (2013.01); *H04W 56/0045* (2013.01); *H04W 72/0413* (2013.01); *H04W 88/02* (2013.01); *H04W 88/10* (2013.01)

(58) Field of Classification Search
USPC .................. 455/450–452.1; 370/252, 254
See application file for complete search history.

(56) References Cited

U.S. PATENT DOCUMENTS

| | | | | |
|---|---|---|---|---|
| 2009/0125959 | A1* | 5/2009 | Oh | ............. H04N 21/4383 725/111 |
| 2011/0256855 | A1 | 10/2011 | Wang | |
| 2012/0008600 | A1* | 1/2012 | Marinier | ............. H04L 5/001 370/336 |
| 2012/0178465 | A1* | 7/2012 | Lin | ............. H04W 24/10 455/450 |
| 2012/0287865 | A1* | 11/2012 | Wu | ............. H04W 74/006 370/329 |
| 2014/0050194 | A1* | 2/2014 | Gaal | ............. H04W 72/0446 370/330 |
| 2014/0219170 | A1 | 8/2014 | Zhao et al. | |

FOREIGN PATENT DOCUMENTS

| | | |
|---|---|---|
| EP | 2725861 A1 | 4/2014 |
| EP | 2744248 A1 | 6/2014 |
| KR | 10-2008-0061487 | 7/2008 |
| KR | 10-2012-0074239 | 7/2012 |
| KR | 10-2012-0083870 | 7/2012 |
| KR | 10-2012-0088767 | 8/2012 |

OTHER PUBLICATIONS

Written Opinion of International Searching Authority dated Jan. 29, 2014 in connection with International Patent Application No. PCT/KR2013/009010, 6 pages.

Extended European Search Report dated Jun. 21, 2016 in connection with European Patent Application No. 13845141.4.

Catt, "Consideration on Multi-TA Capability", 3GPP TSG RAN WG2 Meeting #77bis, Jeju, Korea, Mar. 26-30, 2012, R2-121140, 1 page.

Foreign Communication from Related Counterpart Appiication; Chinese Patent Application No. 201380052600.6; First Chinese Office Action dated Dec. 4, 2617; 18 pages.

* cited by examiner

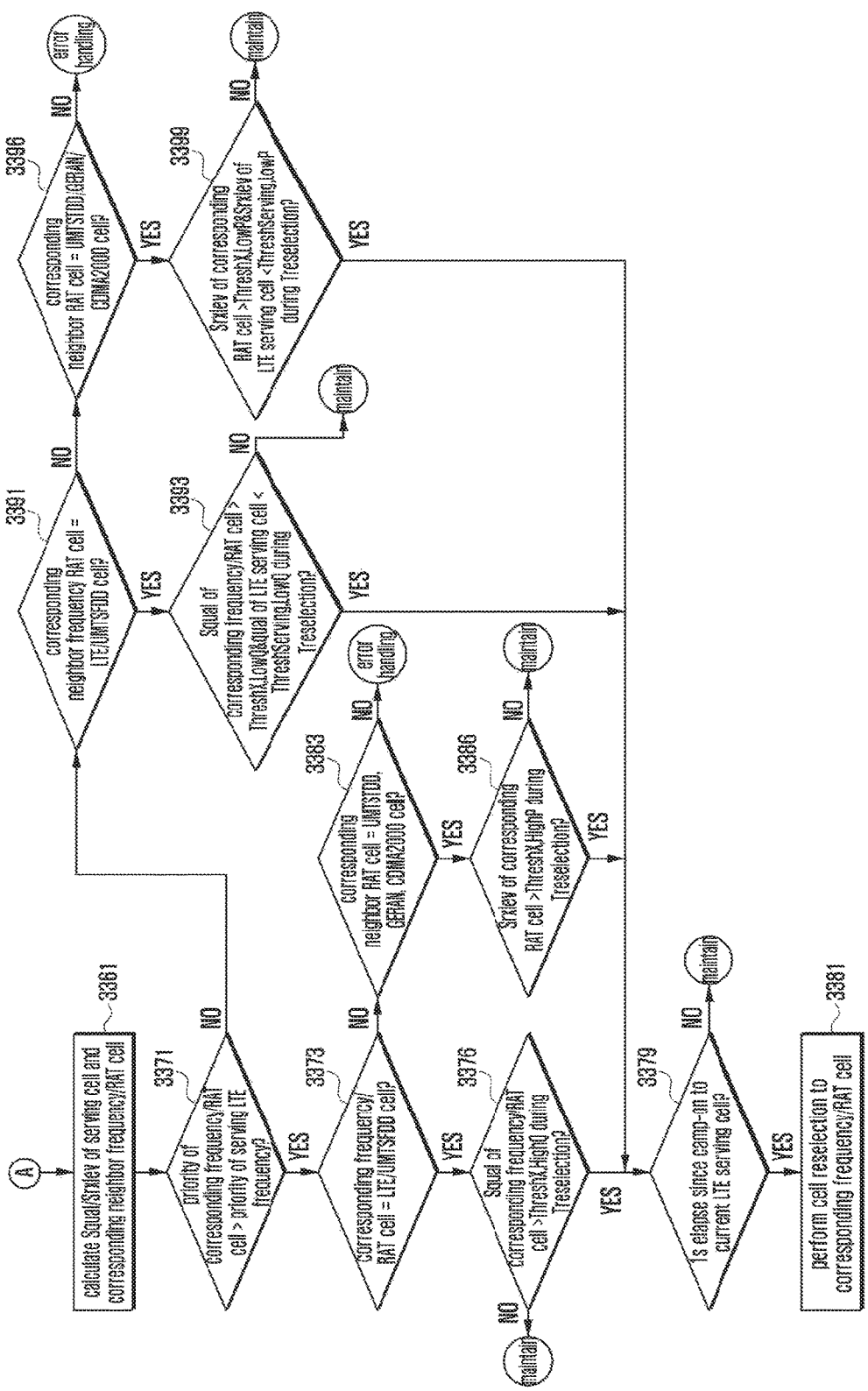

METHOD AND APPARATUS FOR REPORTING PERFORMANCE OF TERMINAL IN MOBILE COMMUNICATION SYSTEM

CROSS-REFERENCE TO RELATED APPLICATION(S)

The present application claims priority under 35 U.S.C. § 365 to International Patent Application No. PCT/KR2013/009010 filed Oct. 8, 2013, entitled "METHOD AND APPARATUS FOR REPORTING PERFORMANCE OF TERMINAL IN MOBILE COMMUNICATION SYSTEM". International Patent Application No. PCT/KR2013/009010 claims priority under 35 U.S.C. § 365 and/or 35 U.S.C. § 119(a) to Korean Patent Application No. 10-2012-0111458 filed Oct. 8, 2012, Korean Patent Application No. 10-2012-0124355 filed Nov. 5, 2012, Korean Patent Application No. 10-2012-0128393 filed Nov. 13, 2012, and Korean Patent Application No. 10-2013-0037676 filed Apr. 5, 2013, which are incorporated herein by reference into the present disclosure as if fully set forth herein.

TECHNICAL FIELD

The present invention relates to a method and apparatus for reporting terminal capability in a mobile communication system.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the $3^{rd}$ Generation Partnership Project (3GPP). LTE aims at commercial deployment around 2010 timeframe and realizing high-speed packet-based communications with the data rate of up to 100 Mbps, which is higher than the currently available data rate, and its standardization is almost complete. In line with the completion of the LTE standardization, an LTE-Advanced (LTE-A) system is now under discussion, which improves a transfer rate by combining the LTE communication system with several new technologies. The term LTE system as used herein may be construed to include the legacy LTE system and the LTE-A system. The term 'LTE system' as used herein may be construed to include the legacy LTE system and the LTE-A system. One of the representative technologies that are newly adopted is Carrier Aggregation. The carrier aggregation is for a terminal to transmit/receive data over multiple carriers. In more detail, the terminal transmits/receives data through predetermined cells (typically, the cells belonging to one base station) and this can be understood that the terminal transmits/receives data through multiple cells.

Multiple Input Multiple Output (MIMO) is another newly introduced technology.

The present invention proposes a method of reporting the terminal capability information related to the newly introduced technologies to the base station efficiently so as to facilitate communication between the base station and the terminal.

DISCLOSURE OF INVENTION

Technical Problem

The present invention aims to provide a method and apparatus for reporting terminal capability using frequency band indicators having different formats.

Solution to Problem

In accordance with an aspect of the present invention, a capability report method of a terminal in a mobile communication system includes receiving a capability report request from a base station, determining an indicator indicating whether a delay time-related operation supported by the terminal fulfils a predetermined condition in response to the request, and transmitting a message including the determined indicator to the base station.

In accordance with another aspect of the present invention, a terminal capability report reception method of a base station in a mobile communication system includes transmitting a capability report request to a terminal and receiving a message including an indicator determined depending on whether a delay time-related operation supported by the terminal fulfils a predetermined condition from the terminal.

In accordance with another aspect of the present invention, a terminal for reporting capability in a mobile communication system includes a transceiver which transmits and receives signals to and from a base station and a controller which controls the transceiver to receive a capability report request from the base station, determines an indicator indicating whether a delay time-related operation supported by the terminal fulfils a predetermined condition in response to the request, and controls the transceiver to transmit a message including the determined indicator to the base station In accordance with still another aspect of the present invention, a base station for receiving terminal capability report in a mobile communication system includes a transceiver which transmits and receives signals to and from a terminal and a controller which controls the transceiver to transmit a capability report request to a terminal and receive a message including an indicator determined depending on whether a delay time-related operation supported by the terminal fulfils a predetermined condition from the terminal.

Advantageous Effects of Invention

The present invention is advantageous in terms of minimizing the size of the capability report message transmitted by the terminal.

MODE FOR THE INVENTION

Figure 1:
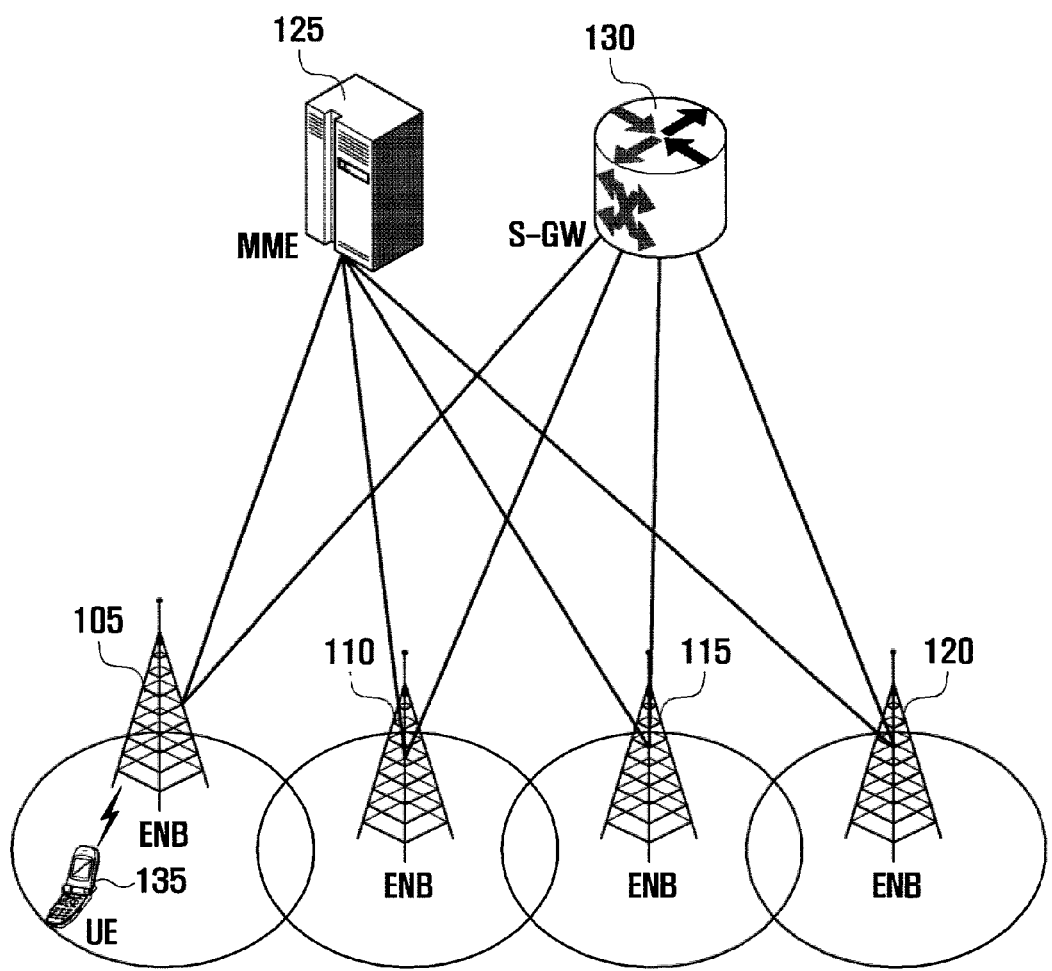
FIG. 1 is a diagram illustrating the architecture of an LTE system to which the present invention is applied.

Exemplary embodiments of the present invention are described with reference to the accompanying drawings in detail.

Descriptions on the technical details well-known in the art and not related directly to the present disclosure are omitted herein. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

Detailed description of well-known functions and structures incorporated herein may be omitted to avoid obscuring the subject matter of the present invention. Exemplary embodiments of the present invention are described hereinafter with reference to the accompanying drawings. A brief description is made of the LTE system before beginning the explanation of the present invention.

FIG. 1 is a diagram illustrating the architecture of an LTE system to which the present invention is applied.

As shown FIG. 1, the radio access network of the LTE system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via the eNBs 105, 110, 115, and 120 and the S-GW 130.

In an embodiment, the eNBs 105, 110, 115, and 120 correspond to the legacy node Bs of the UMTS system. The eNBs 105, 110, 115, and 120 allow the UE 135 to establish a radio channel and are responsible for functions more complicated as compared to the legacy node B. In the LTE system, all the user traffic services including real time services such as Voice over Internet Protocol (VoIP) are provided through a shared channel and thus there is a need of a device to schedule data based on the state information (such as buffer status, power headroom status, and channel condition of the UE), the eNBs 105, 110, 115, and 120 being responsible for such functions. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
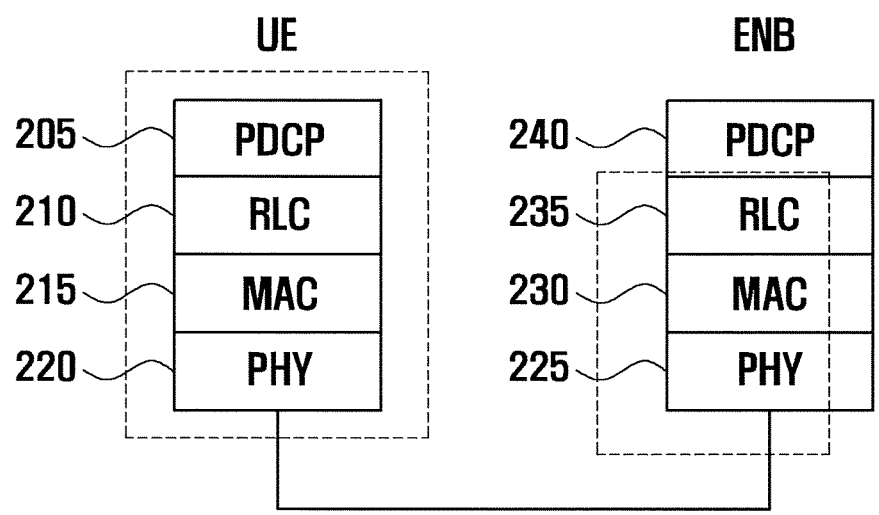
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

<First Embodiment>

The first embodiment of the present invention proposes a method and apparatus for minimizing the signaling overhead caused by extending the frequency band indicator.

The frequency band indicator is the indicator of indicating the frequency band and has a value in the range from 1 to 64 currently. The relationship between the currently defined frequency band indicators and the frequency bands are sorted out in table 1.

TABLE 1

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-624 MHz | 852 MHz-869 MHz | FDD |
| 28 | 703 MHz-748 MHz | 758 MHz-803 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1810 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

The frequency bands 1 to 32 are designated for FDD, and the frequency bands 33 to 64 for TDD. In the table, the FDD frequency band indicators up to 28 are already in use and the rest of available indicators are predicted to be exhausted in the near feature, and thus there is a need of extending the frequency band indicators up to 128.

The simplest way of expending the frequency band indicators is to define new frequency band indicators with the values in the range from 1 to 128. By taking notice that the values 1 from 64 are already being used as the legacy frequency band indicators, this approach may cause inefficiency of wasting the values in the newly defined range.

In the present invention, it is propose to define the range of the new frequency band indicators from 65 to 128 other than from 1 to 128. In order to distinguish between the frequency band indicator in the range from 1 to 64 (hereinafter, referred to as type 1 frequency band indicator) and the frequency band indicator in the range from 65 to 128 (hereinafter, referred to as type 2 frequency band indicator) in using the frequency band for a certain purpose, separate information is used.

The frequency band indicators are used for various purposes as follows.

For UE to report frequency band it supports in the network

For UE to report frequency band combinations it supports in the network

For network to inform UE of frequency band of current cell

For network to inform UE of frequency band of neighboring cell

In all the cases with the exception of the second case, a frequency band is indicated by one of the type 1 frequency band indicator or the type 2 frequency band indicator in one information element. In the second case, a band combination may include a range 1 frequency band (frequency band indicated by the type 1 frequency band indicator. Frequency band indicated by one of the frequency band indicators 1 to 64) and a range 2 frequency band (frequency band indicated by the type 2 frequency band indicator. Frequency and indicated by one of the frequency band indicators equal to or greater than 65) and, at this time, both the type 1 frequency band indicator and type 2 frequency band indicator have to be used in the signal band combination. The band combinations can be sorted as follows.

Band combination including only range 1 frequency bands

Band combination including range 1 frequency band and range 2 frequency band

Band combination including only range 2 frequency bands

In the present invention, the type 1 frequency band combination information is used for the first case, the type 2 frequency band combination information for the second case, and the type 3 frequency combination information for the third case. Whether certain frequency band combination information is the type 1 frequency band combination information, type 2 frequency band combination information, or type 3 frequency band combination information can be identified by tagging a 1-bit or 2-bit information to the frequency band combination information. For example, the frequency band combination information without combination information discrimination information may be identified as the type 1 frequency band combination information, while the frequency band combination information with combination information discrimination information may be identified as the type 2 frequency band combination information or type 3 frequency band combination information.

The frequency band combination information includes at least one frequency band indicator and per-frequency band UE capability information. The frequency band combination information is referenced when the eNB configures carrier aggregation to the UE afterward.

If the frequency band combination information has no combination information discrimination information 305, this means the type 1 frequency band combination information, and the frequency band indicators 310 and 315 included in the information are the type 1 frequency band indicators having the values in the range from 1 to 64. For example, '000000' indicates band 1, and '111111' indicates band 64.

If the frequency band combination information has the combination information discrimination information 325 set to a predetermined value, the frequency band combination information is the type 3 frequency band combination information 320, and the frequency band indicators 330 and 335 including the information are type 2 frequency band indicators with values in the range from 65 to 128. For example, '000000' indicates band 65, and '111111' indicates band 128.

If the frequency band combination information has the combination information discrimination information 345 which is set to another predetermined value, the frequency band combination information is the type 2 frequency band combination information 340 and, in this case, the frequency band indicators 350 and 355 included in the information may indicates the bands in formats different from the type 1 frequency band indicator and type 2 frequency band indicator. For example, UE may tags a bit indicating whether the frequency band indicator included in the type 2 frequency band combination information indicates the range 1 frequency band or the range 2 frequency band to the band indication information. Here, the frequency band indicator tagged with the information indicating whether the frequency band is the range 1 frequency band or the range 2 frequency band is referred to as type 3 frequency band indicator. If the first bit (Most Significant Bit (MSB)) of the type 3 frequency band indicator is 0, the rest 6 bits indicate the range 1 frequency band and, otherwise if the first bit is 1, the rest 6 bits indicate the range 2 frequency band. Accordingly, the frequency band indicator included in the type 2 frequency band combination information (i.e. type 3 frequency band indicator) has a size longer as much as 1 bit than the frequency band indicator included the type 1 or type 3 frequency band combination information (i.e. type 1 frequency band indicator or type 2 frequency band indicator). In another way, it can be considered to define shortened information of the frequency band indicator applied commonly to the range 1 frequency bands and range 2 frequency bands instead of inserting the frequency band indicator into the type 2 frequency band combination information. By taking notice that the number of frequency bands supported by one UE is very less than the 64 or 128, it is possible to further reduce the signaling overhead using the shortened information. The shortened band indicator can be defined as follows.

The information on the frequency band combinations supported by the UE is transmitted using the UE capability report message. The capability report message includes the information on the frequency bands in the form of 'supportable frequency band list' as well as the frequency band combinations supported by the UE. The supportable frequency band list may be divided into a type 1 supportable frequency band list and a type 2 supportable frequency band list. The type 1 supportable frequency band list contains the range 1 frequency bands, and the type 2 supportable frequency band list contains the range 2 frequency bands. Assuming that the type 1 frequency band list includes n range 1 frequency bands, the UE allocates the shortened indicators 0 to [n−1] in the order of insertion of the range 1 frequency bands. Assuming that the type 2 frequency band list includes m range 2 frequency bands, the UE allocates the shortened indicators n to [n+,+1] in the order of insertions of the range 2 freqeuncy band. The UE informs of the corresponding frequency band in the range 2 frequency band combination information using the shortened indicator. The length of the shortened indicator may be set in consideration of the maximum number of frequency bands that UE can support. In the present invention, the length of the shortened indicator is 4 bits.

For example, a certain UE may support the range 1 frequency bands 2, 65, and 67, and the frequency band combinations [1,2], [1,65], [2,65], and [65,67].

The UE includes the information corresponding to the range 1 and range 2 frequency bands, i.e. 000000 and 000001, in the supportable type 1 frequency band list.

The UE includes the information corresponding to frequency bands 65 and 67, i.e. 000000 and 000001, in the supportable type 2 frequency band list.

The UE allocates 0000 as the shortened indicator for the frequency band 1, 0001 as the shortened indicator for the frequency band 2, 0010 as the shortened indicator for frequency band 3, and 0011 for frequency band 4.

The UE includes the shortened indicator combinations corresponding to the frequency band combinations [1,65] and [2,65], i.e. [0000, 0010] and [0001, 0010], in the type 2 frequency band combination information.

Although since the type 1 frequency band combination information is used by the previous release eNB the frequency band has to be indicated using the frequency band indicator as before, the shortened indicator, other than the type 2 frequency band indicator, can be used for the type 3 frequency band combination information. In this case, the type 3 frequency band combination information includes the combination of shortened indicators [0010, 0011].

Figure 4:
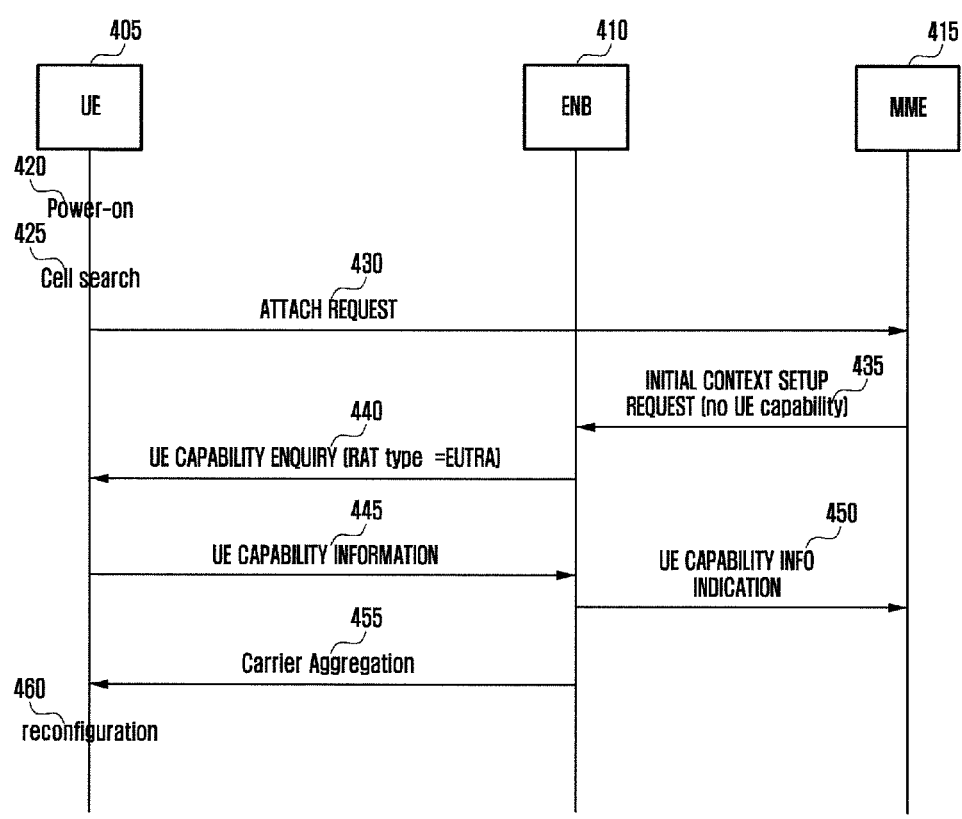
FIG. 4 is a diagram illustrating overall operation of the first embodiment.

FIG. 4 shows the UE operation.

FIG. 4 shows the overall operation of the present invention.

In the mobile communication system including a UE 405, an eNB 410, and an MME 415, the UE powers on at step 420. The UE performs a cell search procedure to find cells and PLMNs and determines the PLMN and cell to perform a registration procedure based on the cell search result at step 425.

The UE performs a RRC Connection Setup procedure through the selected cell and sends the MIME an ATTACH REQUEST message to request for registration at step 430. This message includes the UE identifier.

If the ATTACH REQUEST message is received, the MIME determines whether to accept the UE attachment and, if it is determined to accept, sends the serving eNB of the UE a control message called Initial Context Setup Request at step 435. If the UE has the UE capability information, the UE capability information may be included in the control message; however, the MME has no such information in the initial attachment procedure and thus the control message includes no UE capability information.

If the Initial Context Setup Request message including no UE capability information is received, the eNB sends the UE a control message called UE CAPABILITY ENQUIRY at step 440. This message is of requesting the UE to report capability such as Radio Access Technology (RAT) capability information using the parameter called RAT Type. If the UE is performing the above procedure in the LTE network, the RAT Type is set to Evolved Universal Terrestrial Radio Access (E-UTRA). If there is other radio network, e.g. UMTS network, around, the eNB may request the UE for the UMTS capability information too by adding UTRA to the RAT Type.

If the UE CAPABILITY ENQUIRY message is received, the UE generates UE CAPABILITY INFORMATION including its capability information about the radio technology indicated by the RAT Type. The control message includes a list of the frequency bands supported by the UE and the information on the frequency band combinations supported by the UE. The UE generates the type 1 frequency band list including the frequency bands represented by the frequency band indicators 1 to 64 and the type 2 frequency band list including the frequency bands represented by the frequency band indicators 65 to 128. The UE reports the combinations of the frequency bands in the range of the frequency band indicators 1 to 64 using the type 1 frequency band indicator in the type 1 frequency band combination information, combinations of the frequency bands in the range of the frequency band indicators 65 to 128 using the type 2 frequency band indicators in the type 3 frequency band combination information, and the combinations of the frequency band in the range of the frequency band indicators 1 to 64 and the frequency band in the range of the frequency band indicators 65 to 128 using the shortened indicator in the type 2 frequency band combination information. It is also possible to include the type 3 frequency band combination information in the type 2 frequency band combination information. That is, in the cases with the exception of the combination of the frequency bands in the range of the frequency band indicators 1 to 64 (i.e. all combination of the frequency bands in the rage of the frequency band indicators 65 to 128) is reported using the shortened indicator in the type 2 frequency band combination information. In this case, the UE reports only the type 1 frequency band combination information and type 2 frequency band combination information.

The UE sends the eNB A UE CAPABILITY INFORMATION message at step 445. The eNB sends the MME a UE CAPABILITY INFO INDICATION message to report the UE capability information included in the UE CAPABILITY INFORMATION message to the MME at step 450. The eNB performs reconfiguration to the UE by referencing the UE traffic status and channel condition based on the capability information reported by the UE. For example, if it is reported that the UE has to communicate large amount of data and the UE supports frequency band aggregation, the eNB configures additional carrier (i.e. configured multiple serving cells) to increase the data rate at step 455. The UE performs reconfiguration as commanded by the eNB at step 460 and performs the normal communication procedure.

Figure 5:
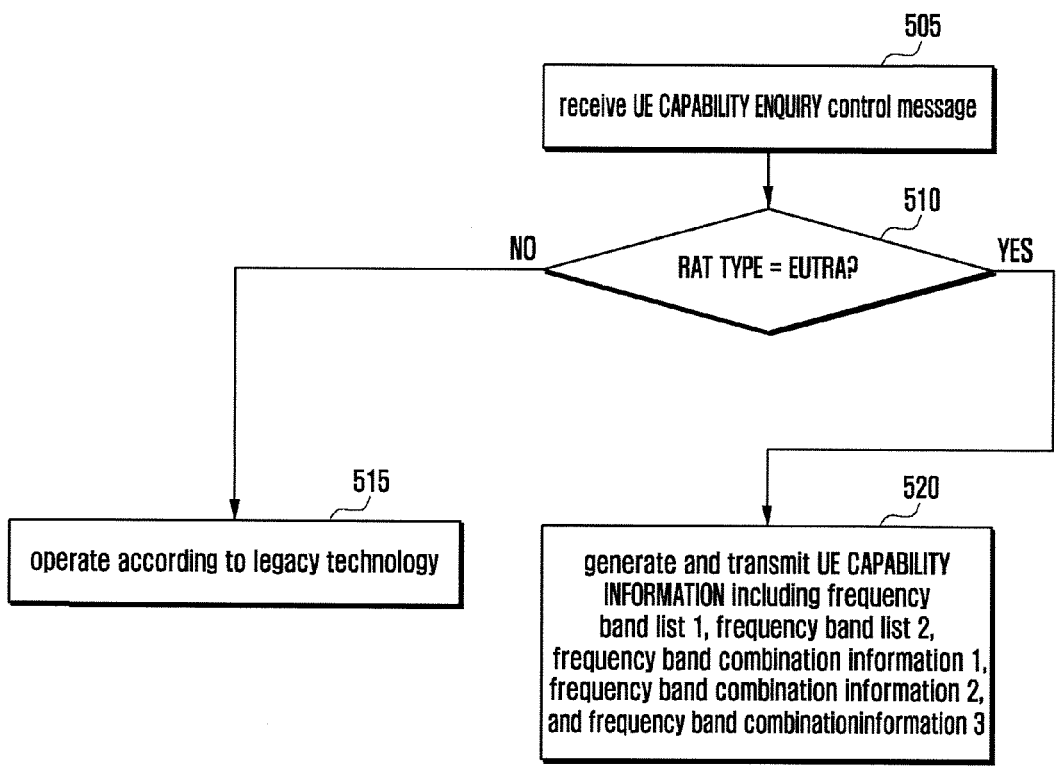
FIG. 5 is a flowchart illustrating UE operation according to the first embodiment.

FIG. 5 shows the UE operation.

If the UE CAPABILITY ENQUIRY message is received at step 505, the UE checks the RAT Type at step 510. If the RAT Type is set to E-UTRA, the procedure goes to step 520 and, otherwise the RAT Type is set other value than E-UTRA, step 515. At step 515, the UE operates according to the conventional technology. At step 520, the UE transmits the UE CAPABILITY INFORMATION message including its LTE capability information. The LTE capability information includes the information as follows.

Type 1 frequency band list and type 1 frequency band combination information are included when the UE supports only the range 1 frequency bands (bands in the range 1 through 64).

Type 1 frequency band list, type 2 frequency band list, type 1 frequency band combination information, type 2 frequency band combination information, and type 3 frequency band combination information are included, when the UE support at least one of range 2 frequency bands (bands in the range 65 through 128).

<Second Embodiment>

In order to increase UE data rate, a technique called carrier aggregation for aggregating multiple serving cells for one UE.

Figure 6:
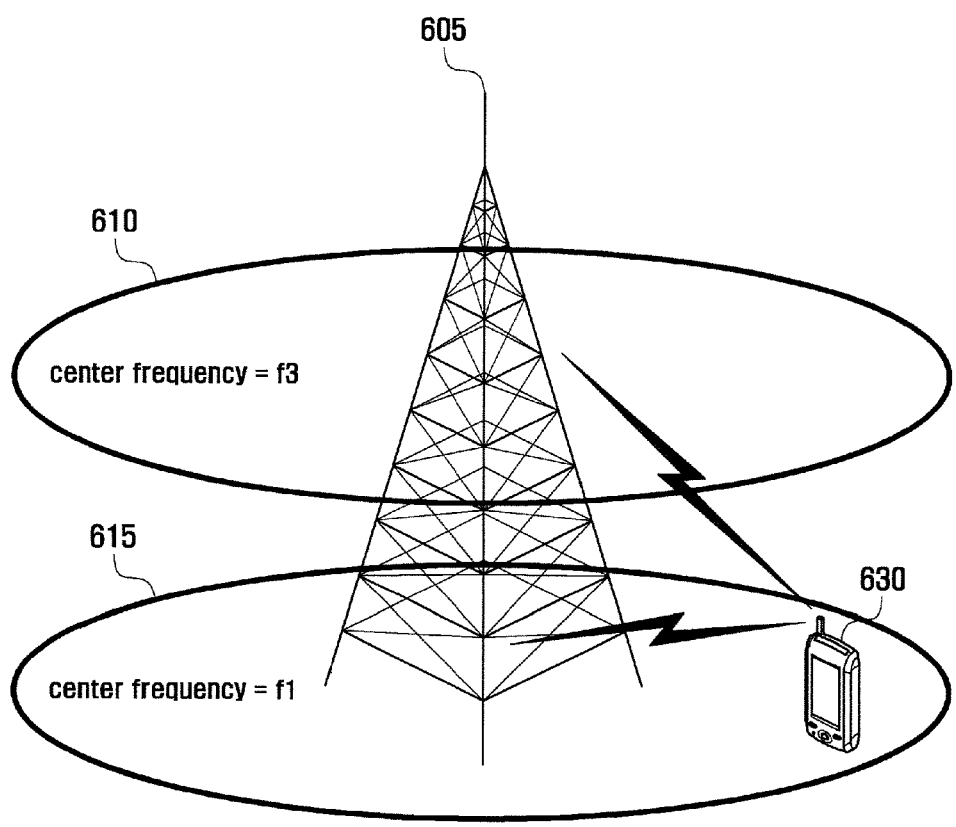
FIG. 6 is a diagram for explaining carrier aggregation

FIG. 6 is a diagram for explaining carrier aggregation.

Referring to FIG. 6, an eNB transmits and receives signals through multiple carriers across a plurality of frequency bands. For example, when the eNB 605 is configured to use the carrier 615 with center frequency at f1 and the carrier 610 with center frequency at f3, the legacy UE transmits/reives data using one of the two carriers. However, the carrier aggregation-enabled UE can transmit/receive data using multiple carriers. The eNB 605 can increase the amount of the resource to be allocated to the carrier aggregation-enabled UE in adaptation to the channel condition of the UE so as to improve the data rate of the UE 630. This technique of aggregating the downlink carriers or uplink carriers at the eNB is called carrier aggregation.

The terms that are used frequently in the following description are defined below.

Assuming that a cell is configured with one downlink carrier and one uplink carrier in the conventional concept, the carrier aggregation can be understood as if the UE communicates data through multiple cells. With the use of carrier aggregation, the peak data rate increases in proportion to the number of aggregated carriers.

In the following description, if a UE receives data through a certain downlink carrier or transmits data through a certain uplink carrier, this means the UE transmits/receives data through a control channel and a data channel provided by the cell corresponding to the center frequency and frequency band characterizing the carrier. In the present invention, the carrier aggregation can be expressed like this 'a plurality of serving cells are configured' along with the use of the terms 'Primary Serving cell (PCell),' 'Secondary Serving cell (SCell),' 'activated service cell,' etc. These terms are used in the same meanings as those used in the LTE mobile communication system and specified in TS36.331 and TS36.321. In the present invention, the terms timeAlignmentTimer, Activation/Deactivation MAC Control Element, C-RNTI MAC CE are used in the meanings as specified in TS36.321.

If a certain SCell is activated, the UE operates as follows.

[Activation Operation]

Transmit SRS if Sounding Reference Signal (SRS) transmission is configured for corresponding SCell Report Channel Quality Indicator/Precoding Matrix Indicator/Rank Indicator/Precoding Type Indicator (CQI/PMI/RI/PTI) for corresponding SCell: The CQI/PMI/RI/PTI for an SCell is the information for channel condition and MIMO operation of the corresponding SCell, and the UE determines CQI/PMI/RI/PTI based on the measurement value to the corresponding SCell and transmits the CQI/PMI/RI/PTI on PUCCH of the PCell. If CQI/PMI/RI/PTI for certain SCell is configured and if the SCell is activated, the SCell performs reporting the CQI/PMI/RI/PTI using the PUCCH transmission resource (or in a predetermined PUCCH format) of the PCell which is allocated for CQI/PMI/RI/PTI transmission.

Start monitoring PDCCH of corresponding SCell: If inter-carrier scheduling is not configured for the corresponding SCell (scheduling information for predetermined SCell is transmitter to the UE through the PDCCH of other SCell than the PDCCH of the corresponding SCell. may be configured by eNB), the UE monitors PDCCH of the activated SCell.

Start monitoring PDCCH of corresponding SCell: If inter-carrier scheduling is configured for the corresponding SCell, the UE monitors the PDCCH of the serving cell to which activated SCell scheduling information transmission is configured to receive the SCell scheduling information.

If a certain SCell is deactivated, the UE stops the above operation. That is, the UE stops transmitting SRS, reporting CQI/PMI/RI/PTI, monitoring PDCCH of SCell, and monitoring PDCCH for SCell.

The activation and deactivation of the SCell is triggered by receiving an Activation/Deactivation MAC Control Element (A/D MAC CE). The A/D MAC CE is the control information of 8-bit bitmap of which bits are mapped to the SCells configured to the UE. The UE activates or deactivates the SCells according to the corresponding bits of the bitmap.

If an A/D MAC CE for activating or deactivating a certain SCell is received at a certain subframe, the UE and the eNB have to perform the activation or deactivation operation at the same timing. However, the time required for perform the activation or deactivation operation may change depending on the UE capability and the condition of the SCell to be activated. Particularly if the Radio Frequency Frontend for the SCell to be activated is in the activated state already, it may take a short time to complete the SCell activation and, otherwise if the Radio Frequency Frontend for the SCell to be activated is in the deactivated state, it may take a long time to complete the SCell activation because it is necessary to activate the Radio Frequency Frontend first. For explanation convenience, the time required for activating the SCell in the case that the Radio Frequency Frontend for the SCell is activated already (i.e. the activated Radio Frequency Frontend covers the frequency band of the SCell) is referred to as activation delay 1, and the time required for activating the SCell in the case that the Radio Frequency Frontend for the SCell is not activated is referred to as activation delay 2.

Typically, the eNB does not know which Radio Frequency Frontend the UE uses for a curtained SCell and thus cannot determine whether the UE uses the activation delay 1 or activation delay 2 when the SCell is activated.

The present invention proposes a method for the UE and the eNB to apply the same activation delay according to a predetermined rule. The rule of determining the activation delay is as follows.

[Activation Delay Determination Rule 1]

In the case of activating a SCell x, if another serving cell (hereinafter, serving cell y) using the same frequency band as the SCell x is activated already, the activation delay 1 is used and, otherwise, activation delay 2 is used.

If there is a serving cell activated already on the same frequency band as the SCell to be activated, this means that the Radio Frequency Frontend for the frequency band of the SCell to be activated is in the active state. In this case, it is preferred to apply the activation delay 1.

[Activation Delay Determination Rule 2]

In the case of activating a SCell x, if serving cell (hereinafter, serving cell y) using the same frequency band as the SCell x is activated already and if the frequency of the serving cell y is a neighboring frequency of the frequency of the SCell x, the activation delay 1 is used and, otherwise (i.e. if at least one of the two conditions is not fulfilled), the activation delay 2 is used.

Although the serving cell y and the SCell x are on the same frequency band, if the two cells are not neighboring in the frequency domain (i.e. the frequencies of the two cells are not contiguous or non-continuous), different Radio Frequency Frontends may be used for the two cells. In this case, although there is a cell activated on the same frequency band, a new Radio Frequency Frontend is activated for the SCell x and thus the activation delay 2 is used.

[Activation Delay Determination Rule 3]

In the case of activating a SCell x, if serving cell (hereinafter, serving cell y) using the same frequency band as the SCell x is activated already, if the frequency of the serving cell y is a neighboring frequency of the frequency of the SCell x, if 'deactivated state measurement cycle' of the SCell x is equal to or less than a predetermined threshold value, the activation delay 1 is used and, otherwise (i.e. if at least one of the three conditions is not fulfilled), the activation delay 2 is used.

The deactivated state measurement cycle is a parameter configured per frequency to determine the SCell measurement frequency of the UE when a SCell is configured on the corresponding frequency and the SCell is deactivated. The reason for deactivating the SCell is to minimize the power consumption. If the measurement to the deactivated SCell is perform too frequently, this makes it difficult to achieve the power consumption minimization and thus the 'deactivated state measurement cycle' is configured to control the measurement frequency to an appropriate level.

If the deactivated state measurement cycle for the SCell x is equal to or less than a predetermined threshold value, adjusting the bandwidth of the Radio Frequency Frontend once at every deactivated state measurement cycle may cause bad influence to the data communication through the serving cell y and thus it is preferred to maintain the Radio Frequency Frontend although the SCell x is deactivated. In this case, since the Radio Frequency Frontend is activated already, when activating the SCell x, the activation delay 1 is applied.

Otherwise if the deactivated state measurement cycle for the SCell x is greater than the predetermined threshold value, the bandwidth of the Radio Frequency Frontend is adjusted to do not include the SCell x, when the SCell x is deactivated, to minimize the power consumption. Accordingly, when the SCell x is activated again, the bandwidth of the Radio Frequency Frontend has to be readjusted and this operation is almost similar to activating the Radio Frequency Frontend and thus the activation delay 2 is applied.

[Activation Delay Determination Rule 4]

When configuring a certain SCell, the eNB determines the activation delay to be applied to the UE. The configuration information of the SCell includes the activation delay length information and, when activating the SCell x, the UE applies a suitable activation delay by referencing whether the activation delay length information is of the activation delay 1 or of the activation delay 2.

In case of activating the SCell x, if the activation delay 1 (or 2) is applied, this means that when the A/D MAC CE for activating the SCell x is received at subframe n the SCell x activation operation starts at the subframe [n+activation delay 1 (or 2)].

Figure 7:
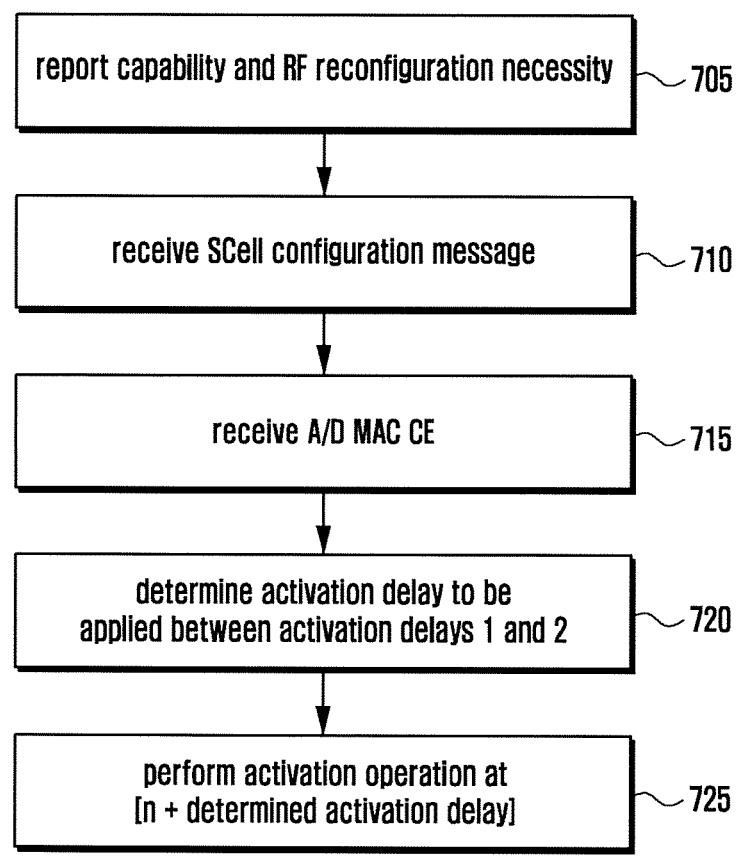
FIG. 7 is a flowchart illustrating UE operation according to the second embodiment.

FIG. 7 is a flowchart illustrating the UE operation of the third embodiment.

Referring to FIG. 7, the UE reports its capability to the eNB at step 705. At this time, the UE reports the frequency bands and frequency band combinations for carrier aggregation, which it supports, along with necessity of Radio Frequency Frontend activation for intra-bend combination, if any, in the frequency band combinations. For example, the UE supports frequency bands x and y and frequency band combinations for carrier aggregation as shown in table 2.

TABLE 2

| | Band combination | Radio Frequency Frontend activation necessity |
|---|---|---|
| Frequency band combination 1 | 1 serving cell on band x | NO |
| Frequency band combination 2 | 1 serving cell on band y | NO |
| Frequency band combination 3 | 2 serving cells on band x | YES |
| Frequency band combination 4 | 2 serving cells on band y | YES |
| Frequency band combination 5 | 1 serving cell on band x, 1 serving cell on band y | NO |
| Frequency band combination 6 | 2 serving cells on band x, 1 serving cell on band y | YES |

The UE sends 1-bit information to report the Radio Frequency Frontend activation necessity for the frequency band fulfilling the following condition.

Band combination having at least two serving cells on one band

In the above example, the frequency band combination 3 is configured with two serving cells on the band x such that the radio frequency frontend activation necessity is reported. If the radio frequency frontend activations is necessary for the band combination having at least two serving cell, this means that when at least one serving cell is in the activated state, the radio frequency frontend has to be activated when the other cell is activated (i.e., different radio frequency frontends are used for the two serving cells).

The UE receives a control message for configuring at least one SCell at step 710. The control message includes the information on the center frequency, frequency band, and cell bandwidth of the SCell. The control message also may include deactivated state measurement cycle to be applied to the SCell. The control message also may include the information on whether to apply the activation delay 1 or activation delay 2 to the SCell. The UE stores the information carried by control message and performs a required reconfiguration operation.

The UE receives an A/D MAC CE for activating the SCell at subframe n at step 715. That is, the UE receives the A/D MAC CE including the bit corresponding to the SCell indicates 'activation' at subframe n. The UE determines whether the SCell is in the activated state already and, if so, waits for receiving a new A/D MAC CE and, otherwise, the procedure goes to step 720.

At step 720, the UE determines whether to apply the activation delay 1 or activation delay 2 to determine the subframe for performing activation of the SCell, i.e. transitioning from the deactivated state to the activated state. At this time, an [activation delay determination rule] is applied.

The UE performs the activation operation at the subframe determined in consideration of the selected activation delay at step 725. That is, if it is determined to apply the activation delay 1, the UE performs the activation operation at subframe [n+activation delay 1] and, otherwise if it is determined to apply the activation delay 2, at subframe [n+activation delay 2]. Alternatively, it can be considered to start part of the activation operation in advance. As described above, the activation delay is a kind of minimum requirement determined in consideration of the UE capability. That is, a relatively long time value is set in order for the low capability UE to meet requirement. Accordingly, a high capability UE may complete preparation for the activation before the activation delay. It is preferred for the UE to complete the operation in advance if pre-performing the operation does not cause any problem. For example, since the CQI/PMI/RI/PTI is transmitted through the activated PCell other the any SCell, it is possible to transmit the information in advance before the activation delay. It is also possible to start monitoring PDCCH for the SCell before the SCell is activated. Accordingly, in the case of activating a SCell, if the radio frequency frontend for the SCell is in the activated state already, the UE performs the whole activation operation at subframe [n+activation delay 1] and, otherwise if the radio frequency fronted for the SCell is not the activated state, performs the CQI/PMI/RI/PTI transmission and monitoring PDCCH for the SCell at subframe [n+activation delay 1] and SRS transmission and SCell PDCCH monitoring at subframe [n+activation delay 2].

Figure 12:
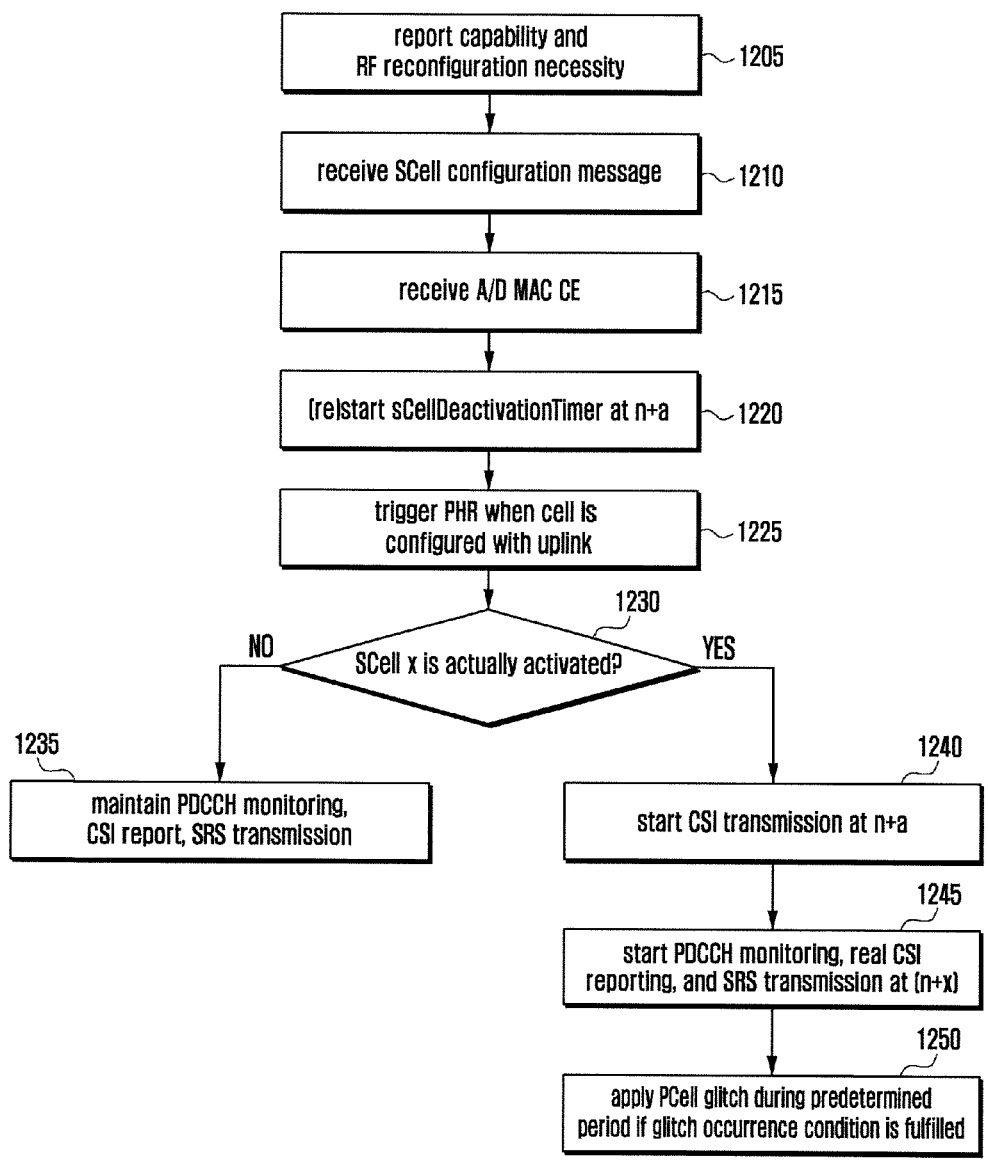
FIG. 12 is a flowchart illustrating another UE operation related to the SCell activation.

FIG. 12 shows another UE operation related to the SCell activation.

The operation depicted in FIG. 12 can be summarized as follows. As described above, since the activation delay is determined in consideration of the lowest capability UE, the high capability UE may complete reconfiguration of the radio frequency frontend before the activation delay lapses. If such a UE is not scheduled until the activation delay lapses, this may cause a problem of degrading the UE capability unnecessarily. The present invention proposes an approach of defining two timings in order for the UE to report the radio frequency frontend reconfiguration completion (or activation reparation completion) dynamically after the first timing. That is, if the activation preparation is completed, the UE reports the activation preparation completion to the eNB, which performs scheduling in the SCell upon receipt of the completion signal. The second timing is of the activation delay in the typical meaning, and every UE has to complete the radio frequency front end reconfiguration and activation preparation at least until the lapse of the second timing.

The activation completion may be reported in various methods.

1) CSI report reflecting channel quality of activated SCell
2) SRS transmission in activated SCell The eNB may configure per-SCell CSI report to the UE which is transmitted through the PCell. The eNB determines the cycle, time duration, and transmission resource for the CSI report and notifies the UE of the related information. Since the transmission format of the other uplink transmission through the PCell, e.g. PUSCH and HARQ feedback transmission, may change depending on whether cis is transmitted, it is preferred to start CSI transmission at a predetermined timing. In the present invention, the UE starts CSI transmission through the SCell at the first timing in consideration of the above matters and, if it fails to perform SCell measurement, reports the CQI set to a predetermined value. Both the CSI and CQI are control signals related to the channel quality of a predetermined serving cell and, although CSI has a broad meaning including CQI, the two terms are used interchangeably in the present invention unless otherwise stated.

The UE and the eNB start CQI transmission/reception at the first timing, and the timing of transmitting/receiving the CQI having a value different from a predetermined value can be determined as the timing of initiating various operations related to the activation.

The SRS transmission is performed through the corresponding SCell other than the PCell; and the eNB determines the SRS transmission cycle, transmission time duration, and transmission resource and notifies the UE of the determination result. Since the SRS transmission does not affect other uplink transmissions in the PCell, there is no need to start the SRS transmission in the state that the SRS transmission is not prepared completely. If the radio frequency frontend configuration for the SCell is completed, the UE starts SRS transmission, and the UE and the eNB determine the SRS transmission start timing as the timing for starting various operations related to the activation.

The UE selects the subframe for starting the operation related to the activation in consideration of both the subframe at which the CSI transmission starts and the subframe at which the SRS transmission starts. That is, the preceding timing among the two timings may be determined as the timing of starting the operations related to the activation.

In summary, when activating a SCell x, the UE sorts the activation-related operations as follows and perform the operations at corresponding timings. Here, n denotes the subframe at which the A/D MAC CE for activating the SCell x is received, and a and b are constants indicating the subframes at which the UE starts transmitting the pseudo CSI. b is a constant related to the activation delay, and every UE has to complete the operations related to the activation at least before b. x denotes the subframe related to the timing at which the UE completes the radio frequency frontend reconfiguration.

Table 3 lists the operations, operation occurrence timings, and description thereof according to an embodiment

TABLE 3

| SCell x activation-related operation | Application timing | Note |
|---|---|---|
| SCellDeactivationTimer start or restart | n + a or n + b | sCellDeactivationTimer is a timer for UE to deactivate SCell x autonomously when there is no scheduling during a predetermined period in SCell x. The start time point of this timer should be the predictable by the eNB and is one of a and be in the present invention. |

TABLE 3-continued

| SCell x activation-related operation | Application timing | Note |
|---|---|---|
| PHR trigger | n + b or time when UL grant for SCell is received | When a serving cell is activated, PHR is triggered to provide the UE transmit power status in the serving cell. At this time, in order to include the useful information on the SCell as much as possible in the PHR, it is necessary to avoid triggering the PHR so promptly. In the present invention the PHR trigger time is set to n + b or time when PUSCH is transmitted fist in the SCell x. |
| Pseudo CSI transmission start | n + a | As described above, the CSI transmission starts at a predetermined time. At this time, if the channel condition in the Scell is not checked yet, the UE transmits the CQI set to a predetermined value (e.g. 0000, out of range). |
| Real CSI transmission start | n + x | As described above, the UE does not report the CSI reflecting the channel state of the SCell unit the radio frequency frontend reconfiguration is completed. The UE reports the CSI reflecting the channel state of the Scell (hereinafter, real CSI) since the subframe at which the radio frequency frontend reconfiguration is completed. x is an integer between a and b and variable depending on the UE capability and condition. |
| SRS transmission start | n + x | As described above, if the radio frequency frontend reconfiguration is completed, the UE starts SRS transmission. |
| PDCCH monitoring | n + x | If the radio frequency frontend reconfiguration is completed, the UE starts monitoring PDCCH for SCell x. |

The UE operation is described hereinafter in detail with reference to FIG. 12.

Step 1205 is identical with step 705.

Step 1210 is similar to step 710, and the SCell configuration control message may further include the following information.

PUCCH configuration information for CSI information transmission for the SCell x, CSI information transmission time duration information, CSI transmission resource information, etc.

SRS transmission resource information for SCell x; SRS transmission time duration information, SRS transmission resource information, etc.

The UE receives an A/D MAC CE instructing activation of the SCell x at subframe n at step 1215. That is, the A/D MAC CE including the bit corresponding to the SCell x is set to 1 is received.

The UE controls a related entity to start the sCellDeactivationTimer of the SCell x at a predetermined time, e.g. n+a or n+b, at step 1220.

If uplink is configured to the SCell x, the UE controls the related entity to trigger PHR at a predetermined time.

The UE determines whether the SCell x activation is real activation at step 1230 and, if so, the procedure goes to step 1240 and, otherwise, step 1235. If the SCell x activation is the real activation, this means that the A/D MAC CE instructing activation of the SCell in the deactivated state. That is, the SCell x is in the deactivated state before step 1215. If the SCell x is not in the real activated state, this means that the A/D MAC CE instructing activation of the SCell which is already in the activated state. The reason why the SCell is not in the real activated state is because, since the A/D MAC CE includes the activation/deactivation state informations on all the serving cells configured to the UE, in order to transition the state of some serving cells among them from the deactivated state to the activated state it is necessary to transmit the activation indication information to other serving cells that are already in the activated cells too.

The UE continue monitoring PDCCH for the SCell x and transmitting CSI and SRS as before at step 1235.

The UE controls the transceiver to start CSI transmission for SCell x through the PCell at the time (n+a) at step 1240. If it fails to determine the CQI to report for the SCell x, the UE reports a predetermined value, e.g. 0000. That is, it reports the CSI set to 0000 at the time between n+a and n+x.

The UE controls the transceiver to start monitoring PDCCH, reporting real CSI, and transmitting SRS at the time n+x at step 1245. Here, x is an integer indicating a subframe fulfilling the following conditions.

[Condition for Determining X]

Assuming the subframe at which the radio frequency frontend reconfiguration has been completed for the SCell x is x', the UE determines subframe x among the subframes identical with or following x' and among CSI-related and SRS-related subframes. The CSI-related and SRS-related subframes are defined as follows.

[SRS-related Subframe for SCell X]

subframe including SRS transmission duration of SCell x which arrive first since completion of radio frequency frontend reconfiguration for SCell x.

[CSI-Related Subframe for SCell X]

First subframe capable of transmitting CSI reflecting channel condition of SCell x since completion of radio frequency frontend reconfiguration for SCell x Even when the UE reports the real CSI for the SCell x, there is still a probability that CQI is set to 0000. In this case, although the UE reports the real CSI, the eNB cannot understand it and thus an error may occur between the UE and the eNB. In order to avoid this problem, the CSI-related subframe for SCell x may be defined as follows.

[CSI-related Subframe for SCell X]

First subframe for reporting CQI not set to 0000 for SCell x since completion of radio frequency frontend reconfiguration for SCell x The CQI reported at subframe y is the value measured at subframe [y−4] or a predetermined subframe earlier. Accordingly, the real CSI report is delayed as long as 4 subframes or longer since the completion of the radio frequency frontend reconfiguration. In order to avoid this, it may be considered to do not apply the timing mapping relationship for the CQI being reported first since the completion of the radio frequency frontend reconfiguration. For example, if the radio frequency frontend reconfiguration is completed at [y−2], the UE measures the channel condition of the SCell x. Although there is channel state value measured at the timing (e.g. y−4) mapped to the above subframe in reporting CQI at subframe y, the UE reports the CQI with the channel state value measured afterward (e.g. measured at [y−1]).

At step 1250, the UE checks whether the radio frequency frontend reconfiguration affects the PCell data transmission/reception and, if so, performs reconfiguration during a predetermined period in which the PCell PDCCH monitoring and PCell uplink transmission are suspended.

The radio frequency frontend reconfiguration for activating SCell x affects the PCell data transmission/reception in the follow case.

The frequency band of the SCell x is identical with the frequency band of the PCell, and the frequency band of the radio frequency frontend processing the frequency band signal does not include the frequency of the SCell x yet.

In the above case, the radio frequency frontend which is responsible for the PCell has to be configured to process the SCell x, and the PCell data transmission/reception is suspended in part of the reconfiguration time duration.

Figure 13:
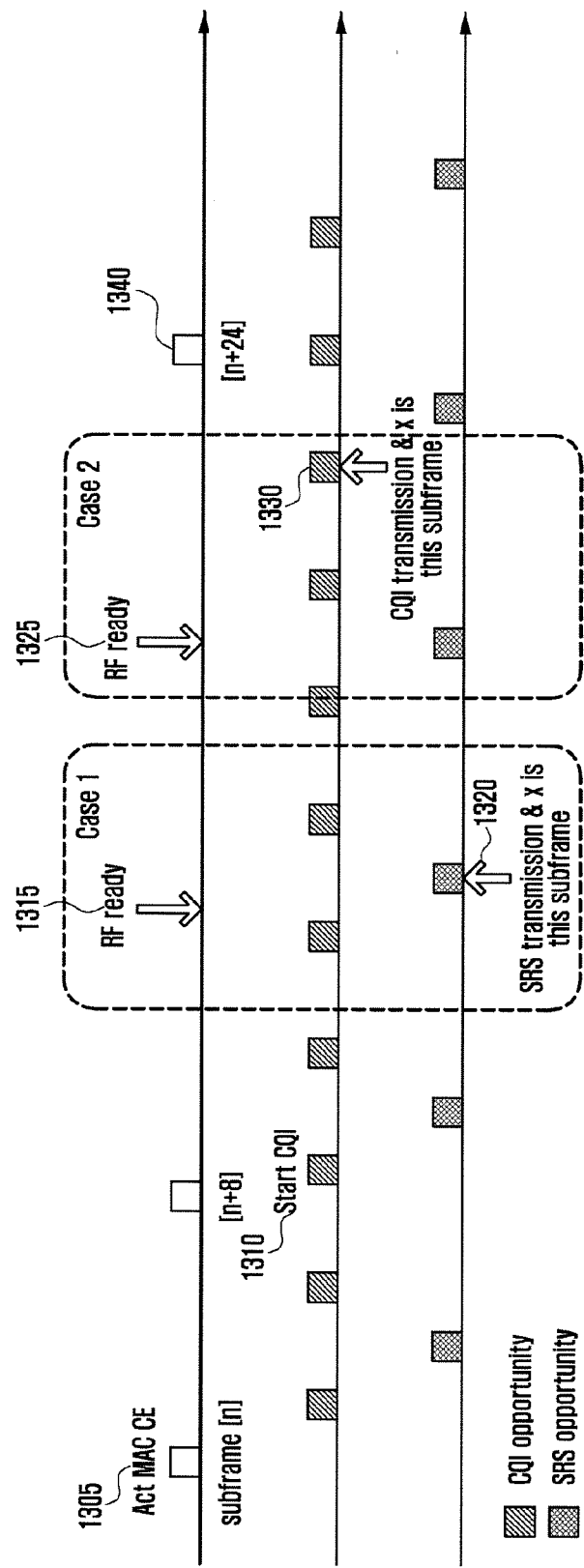
FIG. 13 is a diagram illustrating signal transmission/reception for subframe determination according to an embodiment.

FIG. 13 is a diagram illustrating transmission/reception of the signal for determining the subframe according to an embodiment of the present invention.

Referring to FIG. 13, assuming a=8 and b=24, the UE receives the A/D MAC CE at subframe n as denoted by reference number 1305. The UE starts reconfiguring the radio frequency frontend and transmitting CQI at the first subframe having the CQI transmission resource among the subframes since a predetermined subframe, i.e. [n+8] as denoted by reference number 1310. The CQI is may be reported before the UE completes reconfiguration of the radio frequency frontend to measure the channel condition for the SCell x.

If the RF frontend reconfiguration is completed at a certain time point as denoted by reference number 1315 and then the SRS-related subframe occurs prior to the CSI-related subframe, the UE transmits the SRS in the SRS-related subframe as denoted by reference number 1320 and determines the subframe as subframe [n+x].

If the RF frontend reconfiguration is completed at another time point as denoted by reference number 1325 and then the SRS-related subframe occurs prior to the CSI-related subframe, the UE transmits the CSI as denoted by reference number 1330 and determines the subframe as subframe [n+x].

The eNB sends the UE a control message called RRC Connection Reconfiguration message for configuring a SCell, and the UE sends the eNB a response message.

The response message is transmitted for two main purposes in response to the configuration message.

1. The UE transmits the response message to acknowledge the receipt of the configuration message and report the execution of the command included in the configuration message to the eNB.

2. The UE transmits the response message to report the execution of the command included in the configuration message to the eNB.

If a SCell is configured or released (i.e. an RRC Connection Reconfiguration message for configuring or releasing the SCell is received), the UE (re)configures the RF frontend according to the operation. It takes more time to (re)configure the RF frontend as compared to the other reconfiguration operation indicated by the RRC Connection Reconfiguration message. Accordingly, the time required for the UE to complete necessary operation may vary depending on whether the RRC Connection Reconfiguration message includes the SCell configuration/release information.

If the eNB has commanded a predetermined reconfiguration, it is necessary to receive the response message quickly. Accordingly, the eNB tries to allocate uplink transmission resource to the UE to receive the response message as soon as possible.

At this time, the eNB has to determine the timing for allocating the transmission resource for receiving the response message since the transmission of the RRC Connection Reconfiguration message.

For this purpose, the present invention specifies that the UE generates the response message after predetermined time duration since the receipt of the RRC Connection Reconfiguration to assist the scheduling operation of the eNB. At this time, the time duration is defined differently by taking notice that the RRC Connection Reconfiguration message is transmitted for configuring or releasing the SCell. The configuration delay 1 is applied for the RRC Connection Reconfiguration message with the SCell configuration/release indicator, and the configuration delay 2 for the RRC Connection Reconfiguration message without SCell configuration/release indicator. However, the RF frontend configuration may be maintained in a certain case although the SCell configuration/release is instructed. This is the case when a new SCell is configured at the same time as a configured SCell is released on the same frequency. The SCells on the same frequency may be released using one control message and then reconfigured when reconfiguring the identifiers of the SCells, updating system information for the SCells, and changing some parameters related to the SCells.

Figure 8:
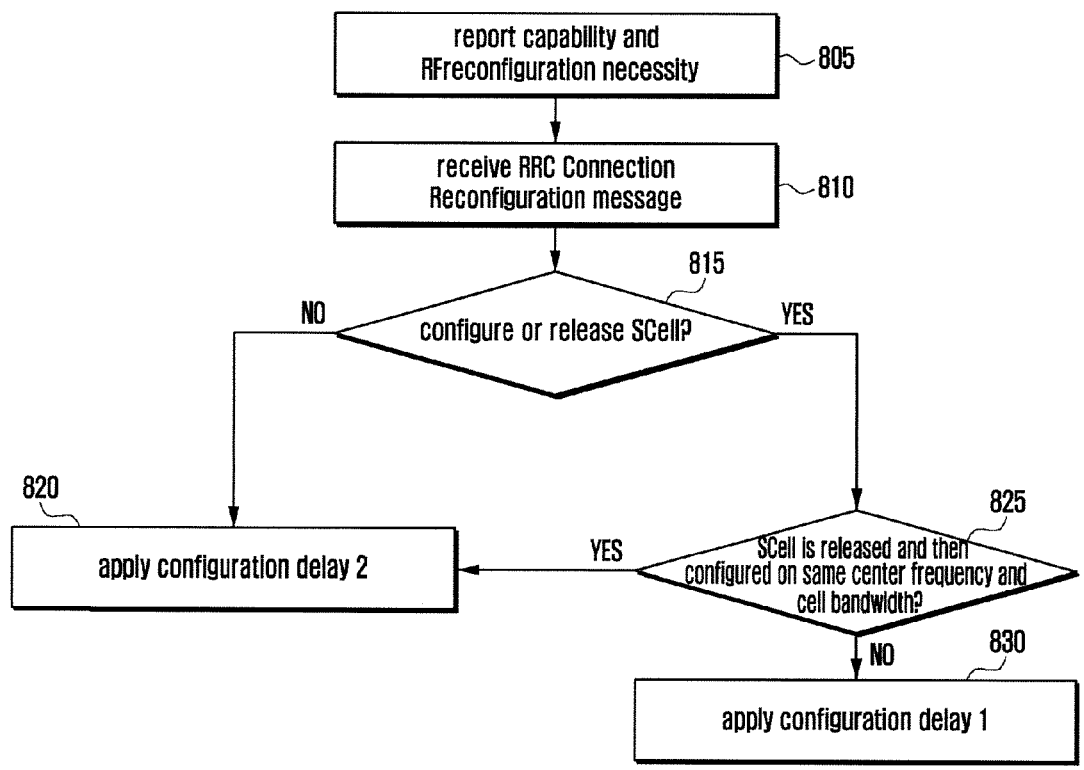
FIG. 8 is a flowchart illustrating another UE operation according to the second embodiment.

FIG. 8 shows the above UE operation.

Step 805 is identical with step 705.

The UE receives an RRC Connection Reconfiguration message at step 810.

The UE determines whether the RRC Connection Reconfiguration message includes SCell configuration/release command at step 815. If the message includes no SCell configuration/release command, the UE applies the configuration delay 2 at step 820.

Otherwise, if the message includes the SCell configuration/release command, the UE determines whether at least one SCell is released and at least one SCell is configured and whether the center frequencies and cell bandwidths of the released and configured SCells are identical with each other at step 825. If all the conditions are fulfilled, the procedure goes to step 820. Otherwise, at least one of the conditions is not fulfilled, i.e. if only a SCell is configured or released or if although a SCell is configured and a SCell is released the center frequencies and cell bandwidths of the released and configured cells differ from each other, the UE applies the configuration delay 1 at step 830.

If the configuration delay 1 or configuration delay 2 is applied, this means that the response message is ready to be transmitted in response to the RRC Connection Reconfiguration message when the RRC Connection Reconfiguration message is received at subframe n or when an uplink grant is received at subframe [n+configuration delay 1 or 2].

The configuration delays 1 and 2 may be to certain values in consideration of the UE capability, and the configuration delay 1 has to have a value greater than that of the configuration value 2 because it is determined in consideration of the extra delay for RF frontend reconfiguration.

<Third Embodiment>

With the popularization of smartphones, the requirements and uses of wireless location area network (WLAN), Bluetooth, and GPS are increasing abruptly. In line with this tendency, a terminal integrates various communication technologies (e.g. legacy cellular network technology (LTE/UMTS), WLAN, Bluetooth, and GNSS/GPS) which bring out interference problem therebetween. This issue is discussed under the title of In-Device Coexistence (IDC) in 3GPP and, in other communication technology with the exception of LTE, call interfering communication technology (interfering CT).

Unlike the LTE/UMTS communication technology operating on various frequency bands, the other communication technology such as Bluetooth and WLAN operates on Industrial, Scientific and Medical band (24000-2483.5 MHz). Among the frequency bands for use in LTE/UMTS communication technology, particularly, in the case of frequency band 4 (2300-2400 MHz) and uplink part of frequency band 7 (2500-2570 MHz), the transmission signal of one communication technology is detected as the reception signal of another communication technology so as to cause significant interference problem. For example, when the WLAN uses channel 1 on the frequency band 40, the effect of interference becomes worse; and in the case that the mobile communication base station uses the frequency band 7 and the WLAN uses channel 13 or 14, interference occurs significantly.

When such effect occurs, it is preferred to hand the UE over to the band without causing interference problem. This can be accomplished through the mutual operation between the UE and the eNB as follows.

1. IDC interference occurs on the current serving frequency

2. The UE sends the eNB a control message reporting occurrence of IDC interference 3. The eNB instructs the UE to measure neighbor cells/frequencies for handover 4. The UE reports measurement result to the eNB 5. Hands the UE over to another frequency based on the measurement report At this time, the UE may be handed over to an LTE cell on another frequency or, if other LTE frequency is not available, to another radio technology (e.g. UMTS) cell.

In the case that the UE is handed over to the LTE cell, since the LTE eNB knows the UE undergoes IDC interference on the previous serving frequency, it does not hand the UE to the frequency until the IDC interference is resolved. If the IDC interference is resolved, the UE reports IDC interference resolution to the LTE eNB. Accordingly, it is preferred to rule out the influence of the IDC interference in measuring the frequency causing the IDC and reporting the measurement result. Meanwhile, in the case that the UE is handed over to another radio technology cell, since the other radio technology base station or radio network controller is not an LTE eNB, it does not know that the UE undergoes IDC interference on the LTE frequency. Accordingly, if the UE reports the measurement result with the exclusion of IDC interference, this may cause a problem of handing the UE over back to the LTE frequency.

In the present invention, the current serving network performs LTE frequency measurement differently depending on whether the current serving network is an LTE network in order to overcome the above problem.

In the case of measuring a frequency x, managing measurement result, and triggering measurement result report; when the frequency x is an LTE frequency and the IDC interference device (WLAN device, Bluetooth device, etc.) of the UE generates a signal causing interference to the frequency x; if the current serving radio technology is the LTE technology (or the serving frequency is the LTE frequency or the frequency band of the serving frequency is the LTE band), the measurement scheme 1 is applied and, otherwise if the serving radio technology is not the LTE technology (or the serving frequency is not the LTE frequency or the serving radio technology is non-LTE technology, e.g. UMTS (or serving frequency is the UMTS frequency or the frequency band of the serving frequency is the UMTS band), the measurement scheme 2 is applied.

Figure 9:
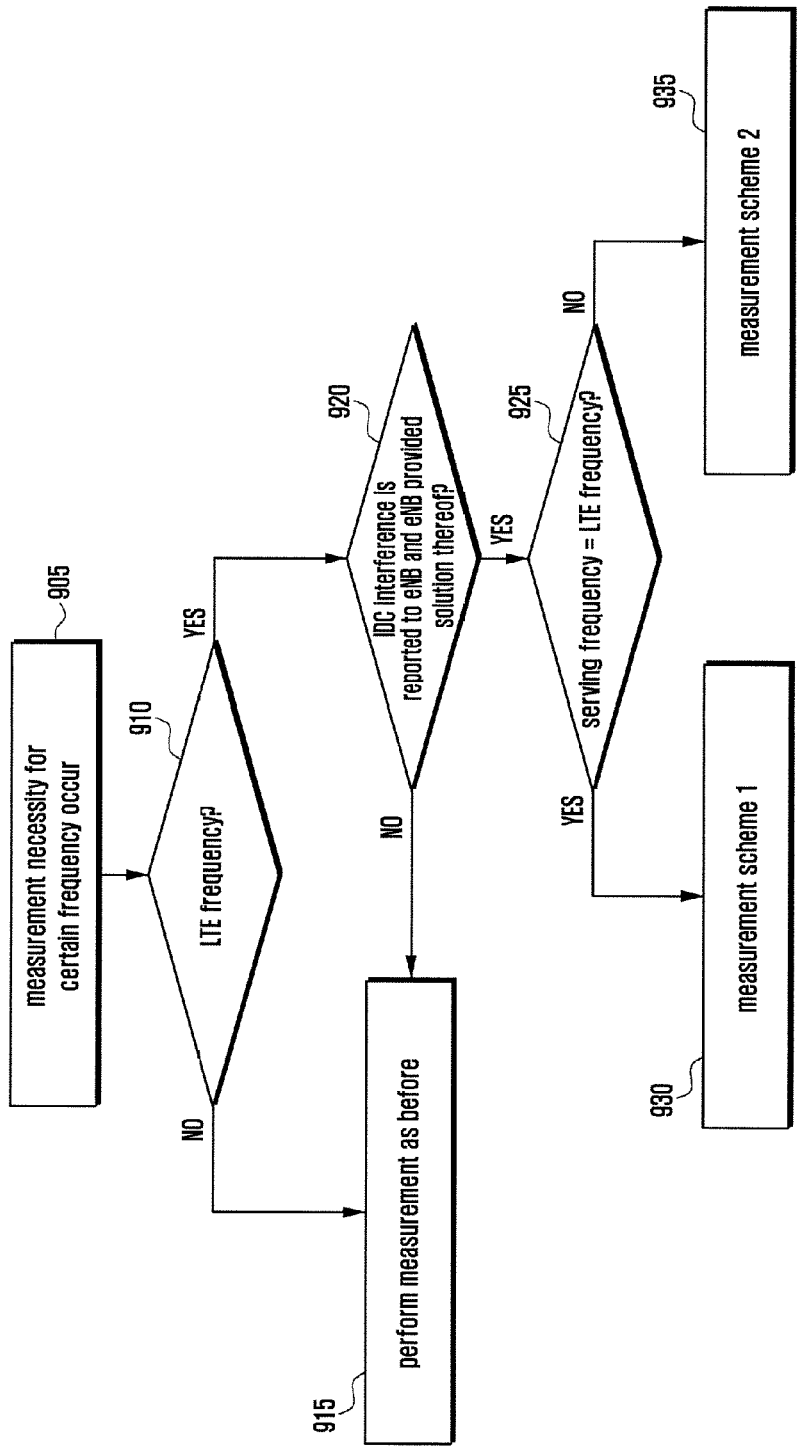
FIG. 9 is a flowchart illustrating UE operation according to the third embodiment.

FIG. 9 shows the UE operation.

In the following, the UE determines the measurement scheme for use in measuring neighboring frequencies (frequencies other than serving frequency), e.g. Reference Signal Received Power (RSRP) or Reference Signal Received Quality (RSRQ).

Neighbor frequency measurement timing arrives at step 905. The UE determines whether the frequency to be measured is an LTE frequency at step 910. If the frequency is not an LTE frequency, the UE performs measurement according to the legacy technology at step 915. If the frequency is not an LTE frequency, the UE determines whether the following condition is fulfilled at step 920.

[Condition]

Has IDC interference occurred on the LTE frequency, has IDC interference occurrence been reported to the eNB, and has the eNB handed the UE over to another frequency band or configured DRX to the UE to resolve the IDC interference (or is the UE capable of communicate data with the eNB in spite of the IDC interference or has the eNB provided a solution for the IDC interference problem)?

If the above condition is not fulfilled, the procedure goes to step 91. If the condition is fulfilled, the procedure goes to step 925 at which the UE determines whether the current serving frequency is an LTE frequency. If so, this means that the eNB knows the IDC interference problem of the UE and thus the UE applies the measurement scheme 1 at step 930. If the current serving frequency is not an LTE frequency (but UMTS frequency), this means the base station or radio network controller does not know the IDC interference problem of the UE and thus the UE applies the measurement scheme 2 at step 935.

[Measurement Scheme 1]

The UE performs measurement periodically and, if there is no IDC interference in the subframe to be measured, the measurement result value is updated by filtering with only the instantaneous measurement value at the subframe in which no IDC interference exists without consideration of the measurement result value at the subframe in which IDC interference exists.

The filtered measurement result value is a weighted average value of the instantaneous measurement values. For example, the measurement result value filtered at the time n is the value obtained by summing the value obtained by multiplying a predetermined weight to the instantaneous measurement result value at time n and the value obtained by multiplying another predetermined weight to the measurement result value filtered at time [n−1].

[Measurement Scheme 2]

The UE performs measurement periodically, updates the measurement value filtered with the instantaneous measurement result value acquired without consideration of existence of IDC interference at the measurement occasion, and determine whether to trigger measurement result message based on the filtered measurement result value.

By reflecting the IDC interference to the measurement result, it is possible to prevent the radio network controller from handing the UE over to the problematic LTE frequency.

[Another Measurement Scheme 2]

Like the measurement scheme 2, the UE selects the subframe for performing instantaneous measurement and updates the filtered measurement result value. In the case of determining whether to trigger the measurement report, however, the UE uses the value obtained a predetermined offset from the filtered measurement result value and also report the measurement result with the value obtained by subtracting a predetermined offset from the filtered measurement result value. That is, the UE determines whether to trigger the measurement result message based on the value obtained by subtracting the offset from the filtered measurement result value. In the case that the measurement result message is triggered, the UE reports the value obtained by subtracting the offset from the filtered measurement result value other than the filtered measurement result value.

By reporting the value poorer than the real channel condition, it is possible to further reduce the probability of handover to the frequency on which IDC interference exists.

<Fourth Embodiment>

When a plurality of serving cells is configured to a UE, Timing Advance Groups (TAGs) are configured to manage the uplink transmission timings of the serving cell efficiently. A TAG is comprised of at least one serving cell, and a UE is configured with at least one TAG. The serving cells belonging to a TAG share the same uplink transmission timing. The TAG including the PCell is referred to as P-TAG and the TAG including only SCells is referred to as S-TAG.

The TAG performance is influenced by the RF frontend structure and band combination of the UE. Particularly, it may be possible or not to configure different TAG for the serving cells formed on the same frequency band depending on the UE and frequency band. If the UE applies independent FFTs to the serving cells, it is possible to configure different TAGs and, otherwise the one FTT is shared, only one TAG. The number of TAGs a UE can support simultaneously depends on the number of uplink transmission timings the UE can maintain at the same time.

At least according to the standard, one UE can support various types of band combinations. For example, one UE may support four band combinations as follows.

Combination 1: two serving cells on band X

Combination 2: two serving cells on band Y

Combination 3: two serving cells on band X and one serving cell on band Y

Combination 4: one serving cell on band X and tow serving cells on band Y

Depending on the UE, the TA performance can differ significantly. For example, a UE does not support a plurality TAGs for combination 1 while another UE may supports a plurality TAGs. A UE may support one TAG on band X and on TAG on band Y, another UE may support two TAG on band X and one TAG on band Y, and another UE may support two TAGs on band X and one TAG on band Y or TAG with one cell on band X and TAG with another cell on band X and one cell on band Y.

In this way, it is possible to generate various combinations depending on whether the serving cells of the same frequency band can be grouped into different TAGs, whether the serving cells on different frequency bands can be grouped into the same TAG, or how many TAGs can be formed with the serving cells on one frequency band.

It may be considered to use a signaling system accommodating all possibilities when the UE reporting its TA capability to the eNB. As shown in the above discussion, such approaches have a shortcoming of complex signaling because all per-band combinations supportabilities have to be displayed.

The present embodiment proposes a method for reporting the TA capability of the UE using 1-bit information per band combination.

The UE indicates whether it supports basic TA capability using 1 bit corresponding to each supported band combination. The basic TA capability means predetermined TA capability which is likely to be supported in general in the current release. In this embodiment, the basic TA capability indicates whether the corresponding band combination is an intra-band combination or an inter-band combination.

Basic TA capability of intra-band combination: support 2 TAGs (i.e. the serving cells on the same band may be grouped into up to two TAGs)

Basic TA capability of inter-band combination: It is possible to configure one Tag per band and TAGs as many as the number of bands of the corresponding band combination.

For example, if it is indicated that the basic TA capability is supported for the band combinations below, the UE capability is as follows.

Combination 1: two serving cells on band X—serving cells on band X can be grouped into up to two TAGs (i.e. support up to 2 TAGs)

Combination 2: two serving cells on band Y—serving cell on band Y can be grouped into up to two TAGs (i.e. support up to 2 TAGs)

Combination 3: two serving cells on band X and one serving cell on band Y—cells on band X is grouped into one TAG and cell on band Y into another TAG (i.e. support up to 2 TAGs)

Combination 4: one serving cell on band X and two serving cells on band Y—cell on band X is grouped into one TAG and cells on band Y into another TAG (i.e. support up to 2 TAGs).

Combination 5: one serving cell on band X, one serving cell on band Y, one serving cell on band Z—cell on band X is grouped into one TAG, cell on band Y into another TAG, and cell on band Z into still another TAG (i.e. support up to 3 TAGs)

If it is indicated that the UE does not support basic TA capability for a band combination, this is one of the two meanings:

1. Do not support multiple TAs for the corresponding band combination or 2. supports the TA capability superior to the basic TA capability for the corresponding band combination.

In the case of section 1, the UE does not report other information for the corresponding band combination; and in the case of section 2, the UE reports additional capability for the corresponding band combination. For example, the additional capability may include at least one of the information indicating whether to support possibilities of the combinations considered with all the cases whether the serving cells on different bands can be grouped into a TAG and whether two or more TAGs can be configured per band.

Figure 14:
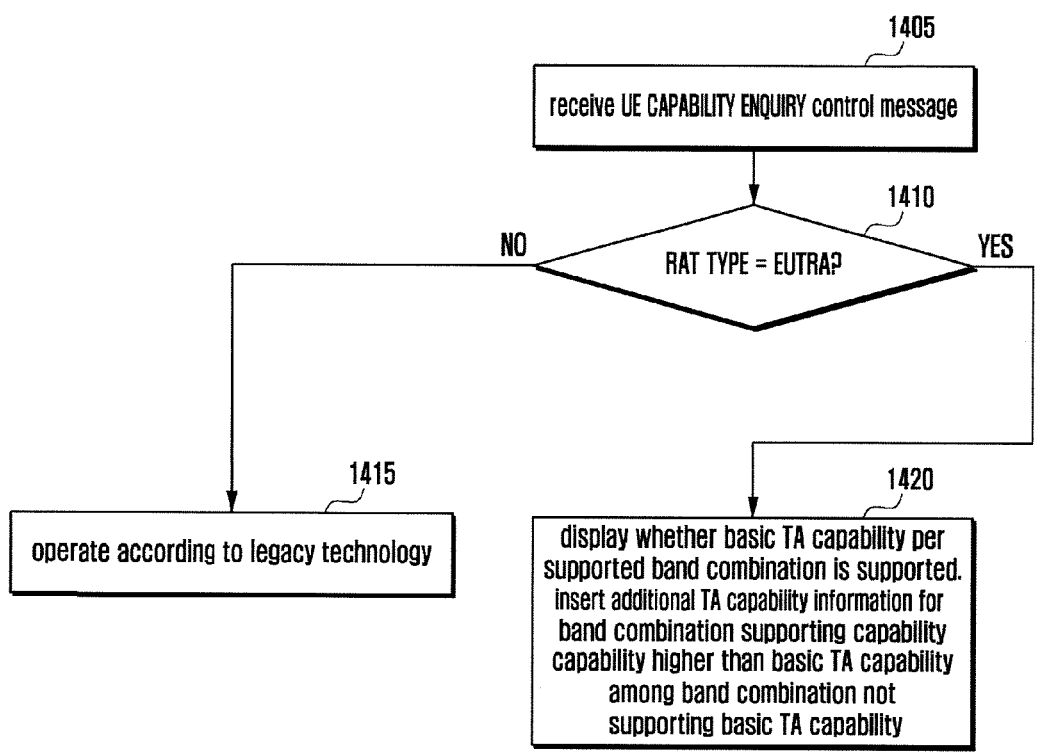
FIG. 14 is a flowchart illustrating UE operation according to the fourth embodiment of the present invention.
Figure 15:
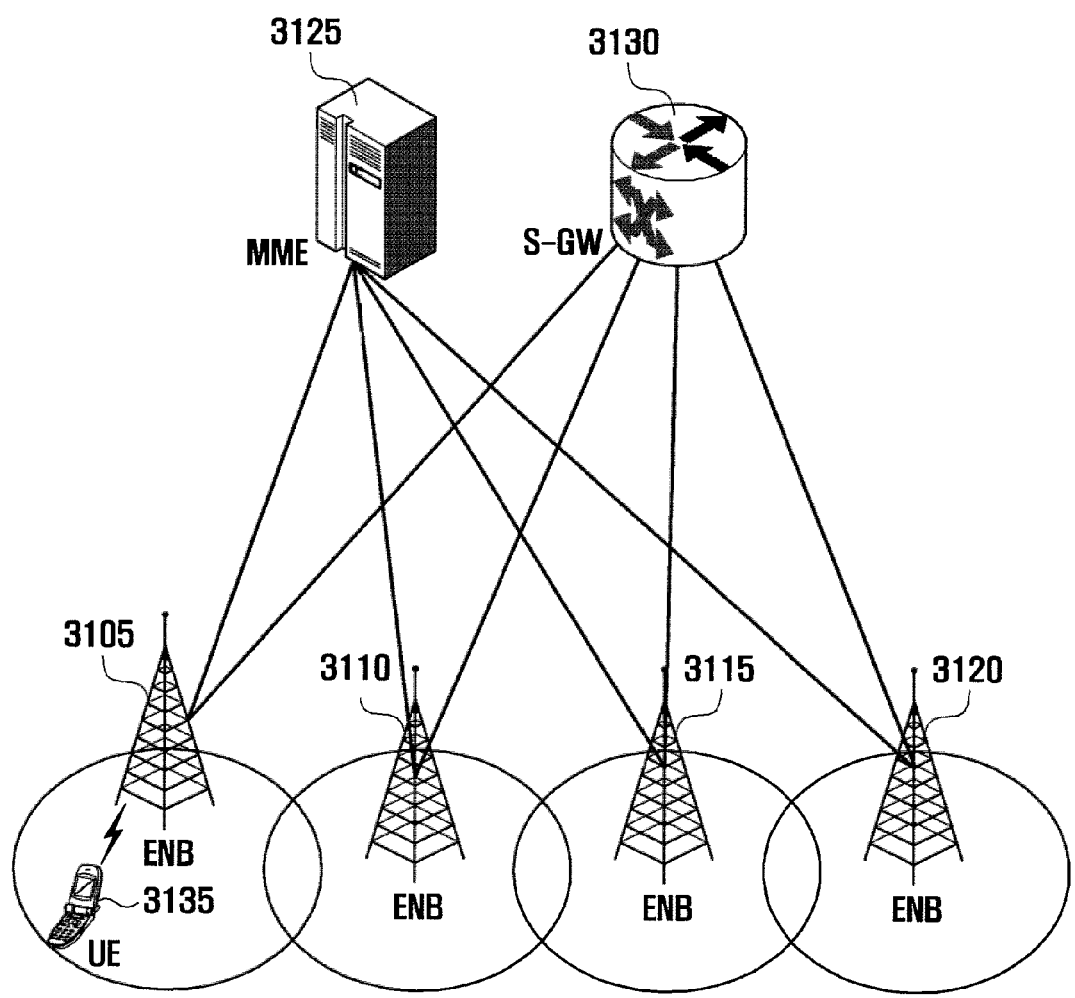
FIG. 15 is a diagram illustrating the architecture of the 3GPP LTE system according to an embodiment of the present invention.

FIG. 14 is a flowchart illustrating the UE operation according to the fourth embodiment of the present invention.

The UE receives a UE CAPABILITY ENQUIRY message at step 1405. If the UE CAPABILITY ENQUIRY message is received, the procedure goes to step 1410. At step 1410, the UE checks the RAT type. If the RAT type is set to EUTRA, the procedure goes to step 1420 and, otherwise the RAT type is set to a value other than EUTRA, step 1415. At step 1415, the UE operates according to the legacy technology.

The UE transmits a UE CAPABILITY INFORMATION message including its LTE capability information at step 1420. The LTE capability information includes one or more band combination information about the band combinations it supports. The UE inserts 1-bit information indicating whether the basic TA capability is supported per band combination information. The basic TA capability information is set to a value which is determined depending on whether the corresponding band combination includes only one band or more. If the corresponding band combination includes only one band, the basic TA capability is the capability of grouping the serving cells on the corresponding band into up to X TAGs. That is, it is the capability of supporting X TAGs. Here, X can be defined as the minimum value between the number of serving cells supported in the band combination and a predetermined integer, e.g. 2. For example, if a band combination includes one band and up to 3 cells can be configured, this means that the basic TA capability of the band combination supports 2 (minimum value 2) TAGs. If a band combination includes two or more bands, this means that the basic TA capability supports one TAG per band.

For the band combination which is indicated to support the basic TA capability, if the band combination does not support multiple TAGs, the UE adds no additional information and, otherwise the band combination supports the TA capability higher than the basic TA capability, adds predetermined addition information.

Figure 19:
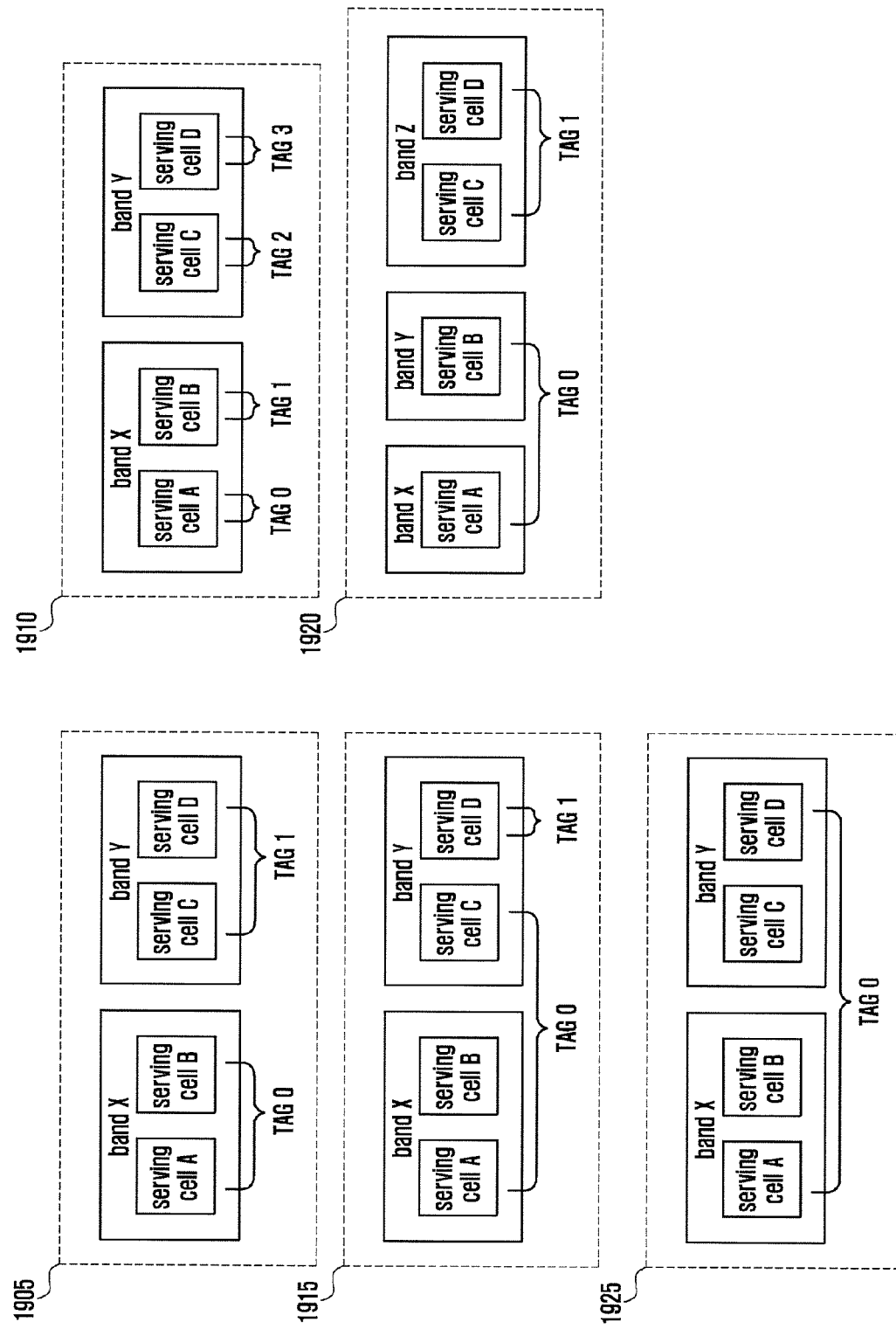
FIG. 19 is a diagram illustrating an inter-band combination according to an embodiment of the present invention.

FIG. 19 shows inter-band combinations according to an embodiment of the present invention. A description is made of the basic TA capability according to an embodiment of the present invention in detail with reference to FIG. 19.

There may be various TAG capabilities applicable to different band combinations. Four TAG capabilities are exemplified below.

1. TAG capability example 1 (1905): only one TAG can be configured per band. It is impossible to configure a TAG including serving cells on different bands.

2. TAG capability example 2 (1910): two or more TAGs can be configured per band. It is impossible to configure a TAG including serving cells on different bands.

3. TAG capability example 3 (1915): two or more TAG can be configured per band, and it is possible to configure a TAG including serving cells on different bands.

4. TAG capability example 4 (1920): up to on TAG can be configured per band, and it is possible to configure a TAG including serving cells on different bands.

As described above, it is not necessary to include the TAG capability 2 1910 and TAG capability example 3 1915 in the basic TA capability. However, it is preferred to include the TAG capability example 4 1920 in the basic TA capability. This is because the TAG capability example 4 1920 includes the case of configuring a TAG with the serving cells on all bands. Accordingly, in this embodiment, the TAG capability examples 1 and 4 are included in the basic TA capability and, in this case, the basic TA capability is defined as follows.

1. basic TA capability of intra-band combination: it is possible to configure one or more TAGs in the corresponding band, and the maximum number of TAGs is identical with the number of serving cells configured on the corresponding band.

2. basic TA capability of inter-band combination: it is possible to configure one or more TAGs in the corresponding band combination, and the serving cells on the same band have to belong to the same TAG (or one TAG). The maximum number of TAGs is identical with the number of bands of the corresponding band combination.

Figure 20:
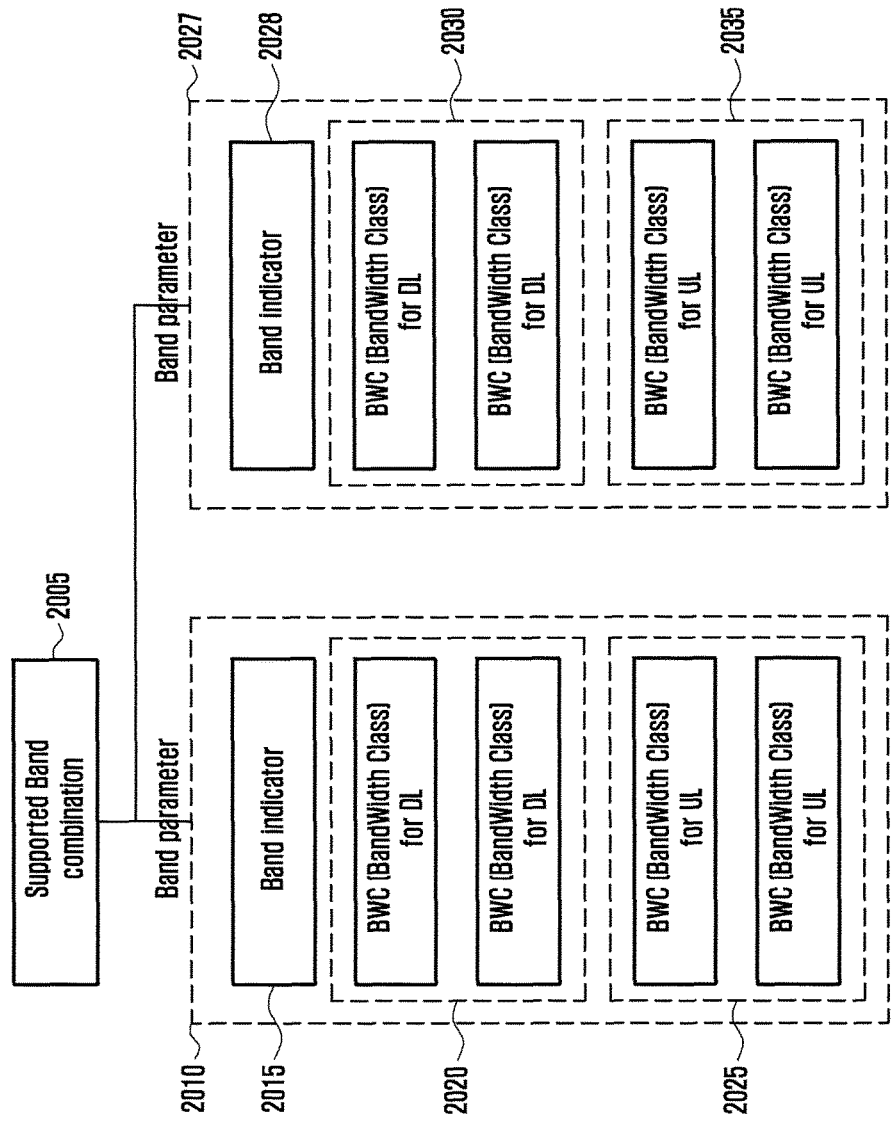
FIG. 20 is a diagram illustrating a format of supportedBandCombination 2005 according to an embodiment of the present invention.

FIG. 20 is a diagram illustrating 'supportedBandCombination' 2005 according to an embodiment of the present invention.

The supportedBandCombination 3005 which the UE reports to the network includes at least one band parameter 2010. The band information 2010 includes a band indicator 2015 indicating the corresponding band number, one or more downlink bandwidth class informations 2020 and 2030, and one or more uplink bandwidth class informations 2025 and 2030.

The bandwidth class informations 2020, 2030, 2025, and 2035 is of expressing the maximum aggregative bandwidth in the corresponding direction (UUDL) of the corresponding band and the number of serving cells together and can be defined in the form as shown in table 4.

TABLE 4

| CA Bandwidth Class | Aggregated Transmission Bandwidth Configuration | Maximum number of CC |
|---|---|---|
| A | Aggregative bandwidth ≤ 20 | 1 |
| B | Aggregative bandwidth ≤ 20 | 2 |
| C | 20 < Aggregative bandwidth ≤ 40 | 2 |
| D | ... | ... |
| E | ... | ... |
| F | ... | ... |

For example, if the bandwidth class is set to B for a frequency band, the corresponding bandwidth class information indicates that up to two carriers (or two serving cells) can be configured on the frequency band and the sum of the bandwidths of the serving cells configured on the frequency band is up to 20 MHz.

Figure 21:
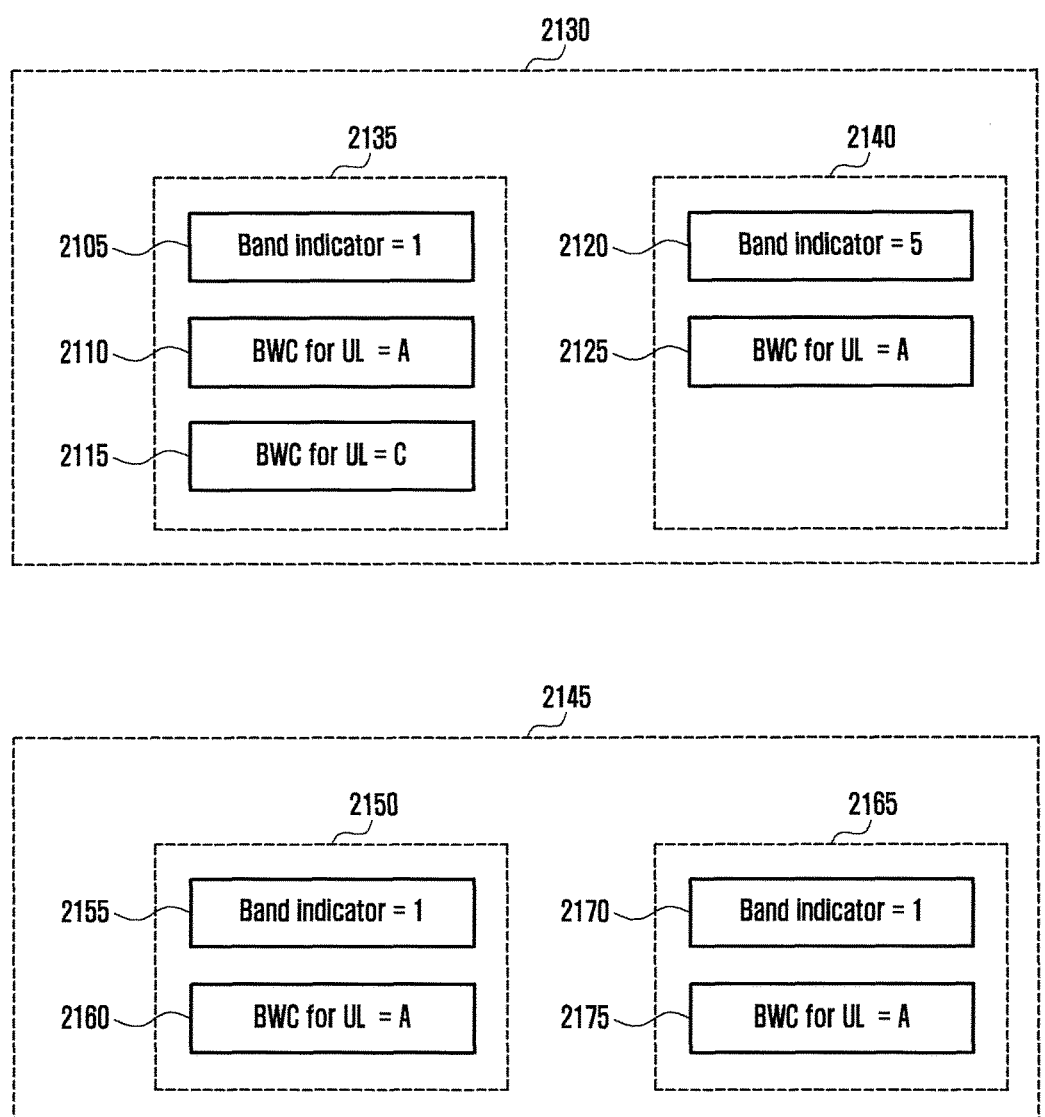
FIG. 21 is a diagram illustrating a structure of supported band combination information according to an embodiment of the present invention.

FIG. 21 shows the band combination information supported according to an embodiment of the present invention.

Since the TAG is related to uplink, it is assumed that the UE has reported supportedBandCombination 2130 when limiting the discussion to the uplink. The information 2130 includes a band parameter 2135 for band 1 and another band parameter 2140 for band 5. The bandwidth class A 2110 and bandwidth class C 2115 are supported for the uplink of band 1. For example, the UE supports one serving cells on band 1 and one serving cell on band 5 or two serving cells on band 1 and one serving cell on band 5 for uplink in the band combination of bands 1 and 5.

One supportedBandCombination 2145 may include two or more band parameters 2105 and 2165 for the same band. That is, the UE may transmits the information indicating of the support of another serving cell on band 1 simultaneously while it supports one serving cell on band 1. This is for reporting the UE capability in the case where the serving cell indicated by the bandwidth class 2160 of the first band parameter 2150 and the serving cell indicated by the bandwidth class 2175 of the second band parameter 2165 are not contiguous. Such a combination is referred to as non-contiguous intra-band combination. The non-contiguous intra-band combination indicates actually the intra-band combination. In view of information format, however, this is closer to the inter-band combination. To the non-contiguous intra-band combination, the basic TA combination of the inter-band combination, other than of the intra-band combination, is applied. If a band parameter of a band combination is called band entry, the basic TA capability can be expressed as follows.

1. basic TA capability for band combination composed of one band entry: one or more TAGs can be formed in the corresponding band entry, and the maximum number of TAGs is identical with the number of serving cells configured for the corresponding band entries 2. basic TA capability for band combination composed of multiple band entries: one or more TAG can be configured in the corresponding band combination, and the serving cells in the same band have to belong to the same TAG (or one TAG). The maximum number of TAGs is identical with the number of band entries of the corresponding band combination.

Figure 22:
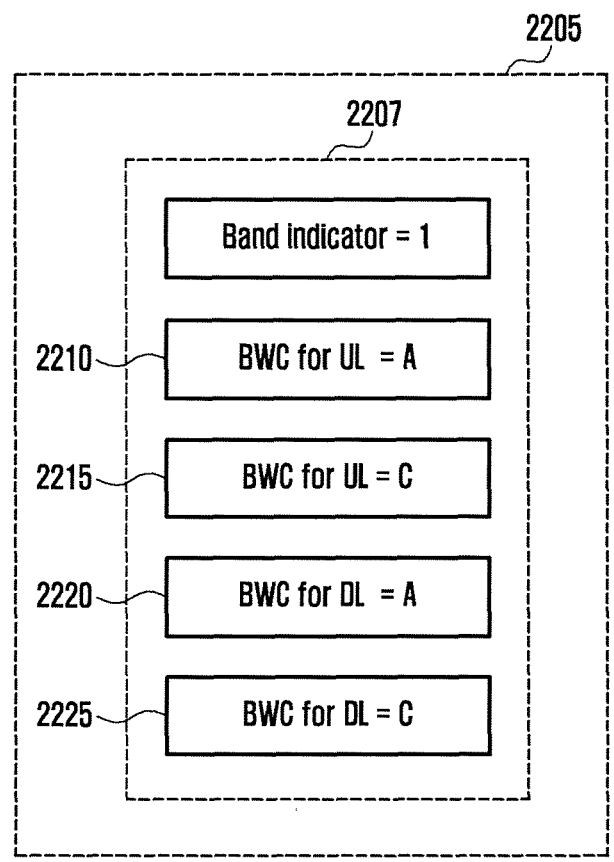
FIG. 22 is a diagram illustrating a structure of supportedBandCombination according to an embodiment of the present invention.

FIG. 22 is a diagram illustrating the structure of the supportedBandCombination according to an embodiment of the present invention.

The 'number of serving cells configured to corresponding band entries' denotes the number of CCs (or number of serving cells) indicated by the highest class (class having largest number of CC) among the bandwidth class for uplink when the band entry includes a plurality bandwidth classes. Here, if it is said the bandwidth class C is higher than the bandwidth class A, this means that the aggregative bandwidth of the bandwidth class C is broader or, although the aggregative bandwidths of the bandwidth classes C and A are identical with each other, the maximum number of CCs of the bandwidth class C is greater. For example, when a UE reports the supportedBandCombination 2205 comprised of one band entry 2207, if the 1 bit representing the basic TA capability supportability is set to YES, this means that the UE supports one or more TAGs for the band combination and the maximum number of TAGs is 2. The band entry 2207 includes two uplink bandwidth classes 2210 and 2215 and two downlink bandwidth classes 2220 and 2225, and the UE determines the maximum number of TAGs based on the bandwidth class C as the highest class among the uplink bandwidth classes.

The UE may transmit its capability report including multiple supportedBandCombination informations and 1 bit indicating whether it supports the basic TA capability per supportedBandCombination. If the supportedBandCombination is comprised of one band entry, the 1 bit may be set to YES or NO depending on whether the UE supports the 'basic TA capability for band combination composed of one band entry.'

If the supportedBandCombination is comprised of two or more band entries, the 1 bit may be set to YES or NO depending on whether the UE supports the 'basic TA capability for band combination comprised of multiple band entries.'

The eNB determines the TA capability supported by the UE for the band combination based on the information indicating whether the supportedBandCombination reported by the UE is composed of one band entry or multiple band entries and the value of 1 bit indicating whether the basic TA capability is supported.

The following embodiment relates to an efficient cell (re)selection method of the UE. This embodiment is directed to the 3$^{rd}$ Generation Partnership Project (3GPP) Long Term Evolution (LTE)/LTE-Advanced (LTE-A) system environment.

FIG. 16 is a diagram illustrating a configuration of the 3GPP LTE system according to an embodiment of the present invention.

The radio access network of the LTE system includes evolved Node Bs (eNBs) 3105, 3110, 3115, and 3120, a Mobility Management Entity (MME) 3125, and a Serving-Gateway (S-GW) 3130. The User Equipment (hereinafter, referred to as UE) 3135 connects to an external network via the eNBs 3105, 3110, 3115, and 3120 and the S-GW 130. The eNBs 3105, 3110, 3115, and 3120 correspond to the legacy node Bs of the UMTS system. The eNB 3105 is connected with the UE 3135 and is responsible for functions more complicated as compared to the legacy node B. In the LTE system, all the user traffic services including real time services such as Voice over Internet Protocol (VoIP) are provided through a shared channel and thus there is a need of a device to schedule data based on the state information collected form the UEs, the eNBs 3105, 3110, 3115, and 3120 being responsible for such functions. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 3130 is an entity to provide data bearers and establishes and releases data bearers under the control of the MME 3125. The MME 125 is responsible for various control functions and may be connected to plural eNBs 3105, 3110, 3115, and 3125.

Figure 3:
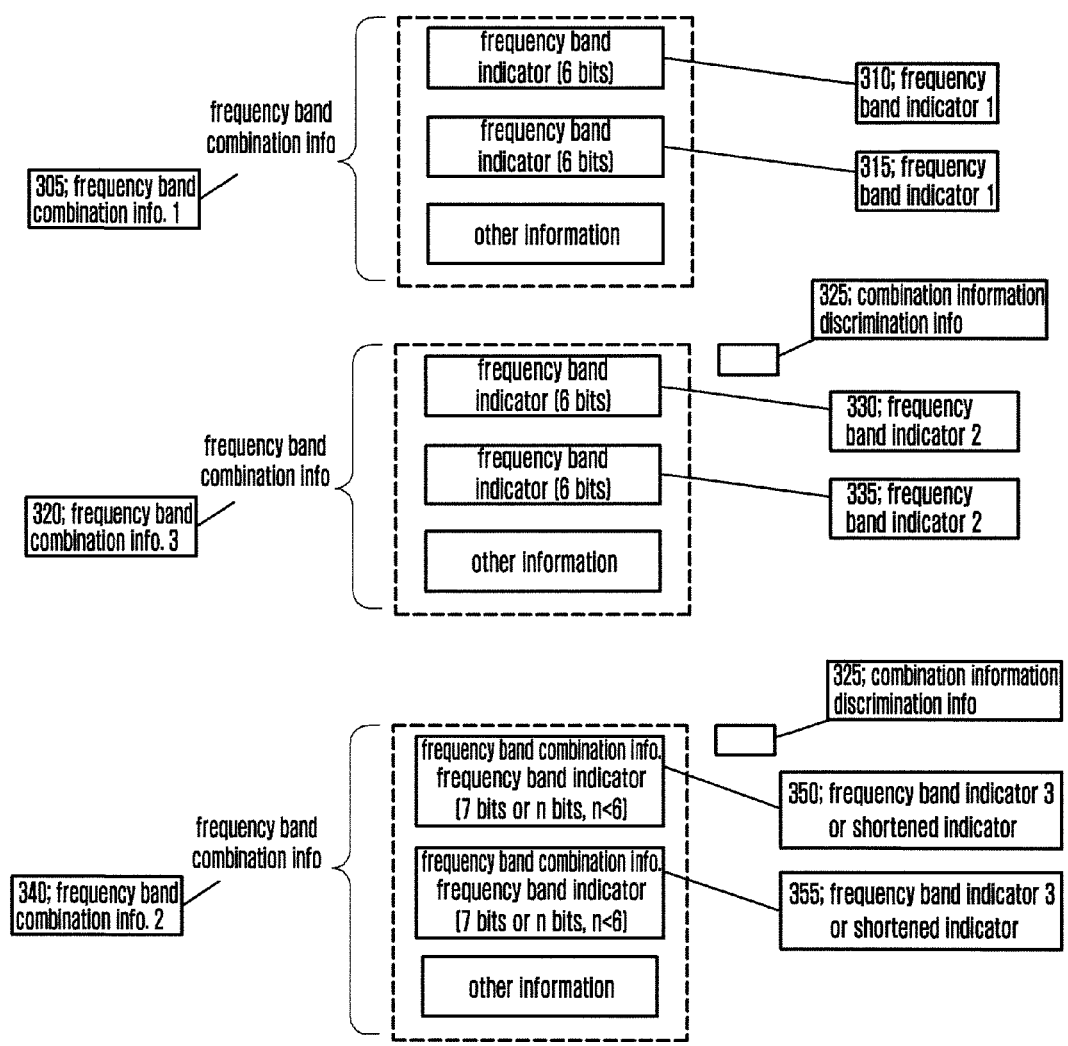
FIG. 3 is a diagram illustrating frequency band combination information of the first embodiment.
Figure 16A:
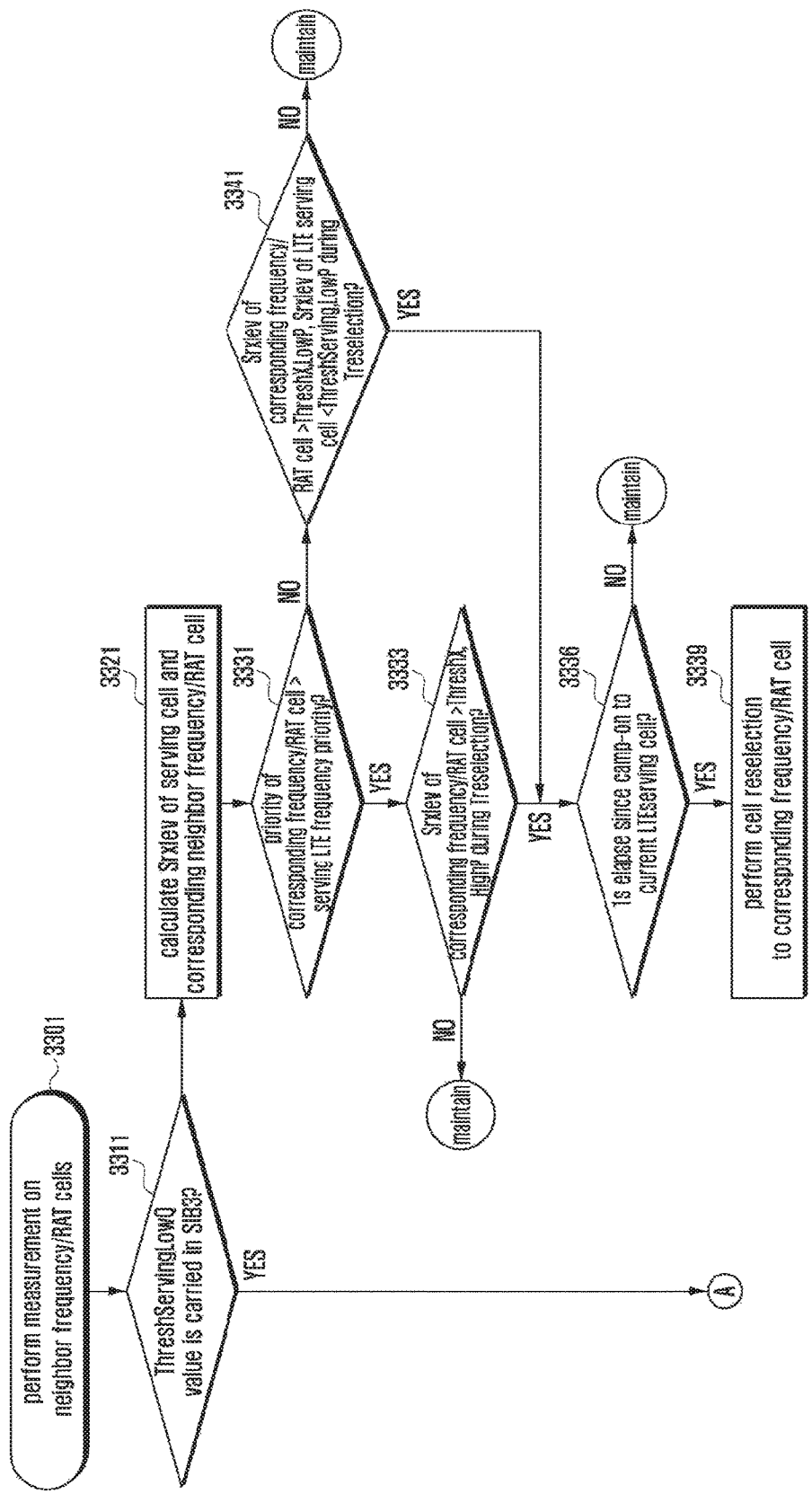
FIG. 16 is a flowchart illustrating a cell reselection procedure of the LTE/LTE-A system according to an embodiment of the present invention.

FIGS. 16a and 16b are a flowchart illustrating the cell reselection procedure according to an embodiment of the present invention. Hereinafter, FIGS. 16a and 16b are collectively referred as FIG. 3. FIG. 16 shows an exemplary inter-frequency/Radio Access Technology (RA cell (re)selection procedure of the UE in the Radio Resource Control (RRC) idle mode. The UE in the RRC idle mode is the UE in the state without RRC connection with the eNB controlling the cell. The UE in the RRC idle mode receives some shared channels such as paging periodically and reselects suitable cell depending on the channel environment to guarantee the UE mobility. The detailed operation of the UE in the RRC idle mode of the 3GPP system is specified in the 3GPP TS36.304 'E-UTRAN UE Procedure in idle mode' and TS25.304 'UTRAN UE Procedure in idle mode.'

In FIG. 16, the block saying 'maintain' means that the UE remains in the current serving cell without cell reselection to a neighbor LTE frequency/RAT frequency. In FIG. 16, the block saying 'error handling' means that the UE performs error handling caused by receipt of unexpected information.

The UE in the RRC idle mode starts measurement on neighbor RATs at step 3301. The UE monitors the System Information Block 3 (SIB3) broadcast within the cell to check whether ThreshServingLowQ is received at step 3311. The ThreshServingLowQ is a threshold value for determining the channel state Squal of the current LTE serving cell as a condition to reselect a neighbor LTE frequency or RAT with priority lower than that of the current LTE serving frequency. The Squal is described later in detail. If the ThreshServingLowQ is not signaled/provided through the SIB3, the procedure goes to step 3321 at which the UE calculates Srxlev values for the LTE serving cell and the neighbor frequency/RAT cells which is received through the system information blocks. The Srxlev denotes Cell selection Rx level value (dB) and calculated with equation (1). However, the Srxlev for CDMA2000 is calculated with equation (2) other than equation (1).

$$Srxlev = Q_{rxlevmeas} - (Q_{rxlevmin} + Q_{rxlevminoffset}) - Pcompensation \quad (1)$$

$$Srxlev = -FLOOR(-2 \times 10 \times \log 10\ Ec/Io) \text{ in units of } 0.5\ dB \text{ (with Ec/Io referring to the value measured from the evaluated cell)} \quad (2)$$

Here, $Q_{rxlevmeas}$ denotes the downlink reception power as a value actually measured on the Downlink (DL) reference channel by the UE. $Q_{rxlevmin}$ denotes the minimum required downlink reception power for selecting the corresponding cell. $Q_{rxlevminoffset}$ denotes an offset value added to $Q_{rxlevmin}$ only when the UE located in the Visited Public Land Mobile Network (VPLMN) searches for higher priority PLMN. Pcompensation denotes an offset value to balance the uplink and downlink channel states in consideration of the uplink channel condition. Table 5 explains the respective parameters.

TABLE 5

| | |
|---|---|
| Srxlev | Cell selection RX level value (dB) |
| $Q_{rxlevmeas}$ | Measured cell RX level value (RSRP) |
| $Q_{rxlevmin}$ | Minimum required RX level in the cell (dBm) |
| $Q_{rxlevminoffset}$ | Offset to the signaled $Q_{rxlevmin}$ taken into account in the Srxlev evaluation as a result of a periodic search for a higher priority PLMN while camped normally in a VPLMN [5] |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

The DL reference channel for channel measurement may vary depending on the system. In the case of the E-UTRAN system, the UE measures Reference Signal (RS) channel. In the case of the UTRAN FDD system, the UE measures the Common Pilot Channel (CPICH). In the case of the UTRAN TDD system, the UE measures the Primary Common Control Physical Channel (P-CCPCH). In the case of the GERAN system, the UE measures the Broadcast Channel (BCCH).

The $Q_{rxlevmeas}$ of the LTE serving cell may be acquired using the Reference Signal Received Poser (RSRP). The $Q_{rxlevmeas}$ of the neighbor UTRAN FDD/TDD system cell may be acquired using the Received Signal Code Power (RSCP). The $Q_{rxlevmeas}$ of the neighbor GERAN system cell may be acquired using the Received Signal Strength Indicator (RSSI). The respective measurement parameters are specified in the 3GPP TS36.214 'E-UTRA Physical Layer Measurements' and TS25.215 'Physical Layer—Measurements (FDD).'

The UE determines whether the priority of the measurement target neighbor LTE frequency/RAT frequency is greater than that of the serving LTE frequency at step 3331. The priority information indicates the frequency as the target for cell reselection with priority. The priority information may be acquired from the system information broadcast in the serving LTE cell or UE-specific message (e.g. RRC Connection Release) when the UE is in the RRC connected state. If the priority of the measurement target neighbor LTE frequency/RAT frequency is greater than that of the serving LTE frequency, the procedure goes to step 3333. Otherwise if the priority of the measurement target neighbor LTE frequency/RAT frequency is not greater than that of the serving LTE frequency, the procedure goes to step 3341.

At step 3333, the UE determines whether the Srxlev of the neighbor LTE frequency/RAT frequency cell is greater than ThreshX,HighP during the Treselection timer period. If the Srxlev of the neighbor LTE frequency/RAT frequency cell is greater than ThreshX,HighP during the Treselection timer period, the procedure goes to step 3336. If the Srxlev of the neighbor LTE frequency/RAT frequency cell is not greater than ThreshX,HighP during the Treselection timer period, the current serving cell is maintained and the cell reselection procedure ends.

At step 3336, the UE determines whether 1 second has elapsed since the UE camp-on to the current serving cell. If 1 second has elapsed since the camp-on to the current serving cell, the procedure goes to step 3339 at which the UE performs cell reselection to the corresponding neighbor LTE frequency/RAT frequency cell. Otherwise if 1 second has not elapsed, the UE remains in the current cell. The Treselection timer value to be applied to the neighbor LTE frequency/RAT frequency and the ThreshX,HighP Srxlev comparison threshold may be received through the system information broadcast in the serving LTE cell.

If the priority of the measurement target neighbor LTE frequency/RAT frequency is not greater than that of the serving LTE frequency at step 3331, the procedure goes to step 3341. At step 3341, the UE determines i) whether the Srxlev of the neighbor LTE frequency/RAT frequency cell is greater than the ThreshX,LowP and ii) whether the Srxlev of the current LTE frequency serving cell is less than the ThreshServing,LowP. If the two conditions i) and ii) are fulfilled, the procedure goes to step 3336. Otherwise if the two conditions i) and ii) are not fulfilled, the cell reselection to the neighbor LTE frequency/RAT frequency cell does not occurs.

If the ThreshServingLowQ is signaled/provided through the SIB3 at step 3311, the procedure goes to step 3361. At step 3361, the UE calculates the Squal of the serving cell and the Squal of the neighbor LTE frequency/UTRAN FDD frequency cell using the UE's measurement result and the system information broadcast in the serving cell. If the neighbor RAT is a UTRAN TDD or GERAN or CDMA2000 system, the Srxlev is calculated.

The Squal denotes the Cell selection quality value (dB) and may be calculated using equation (3).

$$\text{Squal} = Q_{qualmeas} - (Q_{qualmin} + Q_{qualminoffset}) \quad (3)$$

Here, $Q_{qualmeas}$ denotes the ratio between received signal strength of the DL RS channel and the total noise that are measured actually by the UE, $Q_{qualmin}$ denotes the minimum signal-to-noise ratio level required for selecting the corresponding cell, and $Q_{qualminoffset}$ denotes a threshold value which is added to $Q_{qualmin}$ only when the UE in the VPLMN searches for the PLMN with the higher priority. The respective parameters are explained in table 6.

TABLE 6

| | |
|---|---|
| Squal | Cell selection quality value (dB) |
| $Q_{qualmeas}$ | Measured cell quality value (RSRQ) |
| $Q_{qualmin}$ | Minimum required quality level in the cell (dB) |
| $Q_{qualminoffset}$ | Offset to the signaled $Q_{qualmin}$ taken into account in the Squal evaluation as a result of a periodic search for a higher priority PLMN while camped normally in a VPLMN [5] |

The $Q_{qualmeas}$ of the serving LTE cell and neighbor LTE frequency cell are acquired using the Reference Signal Received Quality (RSRQ). The $Q_{qualmeas}$ of the neighbor UTRAN frequency cell is acquired using Ec/No. The Ec/No is acquired using RSCP/RSSI. The RSSI stands for Received Signal Strength Indicator. The RSRQ is specified in the 3GPP TS36.214 'E-UTRA Physical Layer Measurements.' The Ec/No is specified in the 3GPP TX25.215 'Physical Layer—Measurements (FDD).'

The UE determines whether the priority of the neighbor LTE frequency/RAT frequency as a measurement target is higher than that of the serving LTE frequency at step 3371. The UE selects the frequency for cell reselection based on the priority information. The priority information is received through the system information broadcasted in the serving LTE cell or a UE-specific message, e.g. RRC Connection Release, when the UE in the RRC Connected state.

If the priority of the neighbor LTE frequency/RAT frequency as a measurement target is higher than that of the serving LTE frequency, the procedure goes to step 3373. Otherwise if the priority of the neighbor LTE frequency/ RAT frequency as a measurement target is not higher than that of the serving LTE frequency, the procedure goes to step 3391.

At step 3373, the UE determines whether the corresponding neighbor frequency is a neighbor LTE frequency and whether the neighbor RAT frequency is a UTRAN FDD system. If the corresponding neighbor frequency is a neighbor LTE frequency or whether the neighbor RAT frequency is a UTRAN FDD system, the procedure goes to step 3376. Otherwise if neither the corresponding neighbor frequency is a neighbor LTE frequency nor the neighbor RAT frequency is a UTRAN FDD system, the procedure goes to step 3383.

At step 3376, the UE determines whether the Squal of the neighbor LTE frequency/UTRAN FDD frequency cell is greater than the ThreshX,HighQ during the Treselection timer period. If the Squal of the neighbor LTE frequency/ UTRAN FDD frequency cell is greater than the ThreshX, HighQ during the Treselection timer period, the procedure goes to step 3379. Otherwise if the Squal of the neighbor LTE frequency/UTRAN FDD frequency cell is not greater than the ThreshX,HighQ during the Treselection timer period, the cell reselection procedure ends.

The UE determines whether 1 second has elapsed since the camp-on to the current serving LTE cell at step 3379. If 1 second has elapsed since the camp-on to the current serving LTE cell, the procedure goes to step 3381 at which the UE performs cell reselection to the corresponding neighbor LTE frequency/UTRAN FDD frequency cell. Otherwise if 1 second has not elapsed since the camp-on to the current serving cell, the UE remains in the current cell and ends the cell reselection procedure.

At step 3383, the UE determines whether the neighbor RAT frequency is a UTRAN TDD/GERAN/CDMA2000. If the neighbor RAT is a UTRAN TDD/GERAN/CDMA2000, the procedure goes to step 3386. Otherwise if the neighbor RAT is not a UTRAN TDD/GERAN/CDMA2000, this means an error has occurred and this the UE performs and error handling operation. At step 3386, the UE determines whether the Srxlev of the neighbor RAT frequency cell is greater than the ThreshX,HighP during the Treselection timer period. If the Srxlev of the neighbor RAT frequency cell is greater than the ThreshX,HighP during the Treselection timer period, the procedure goes to step 3379. Otherwise if the Srxlev of the neighbor RAT frequency cell is not greater than the ThreshX,HighP during the Treselection timer period, the UE remains in the current cell and ends the cell reselection procedure.

The UE determines whether the corresponding neighbor frequency is a neighbor LTE frequency or whether the neighbor RAT frequency is a UTRAN FDD system at step 3391. If the corresponding neighbor frequency is a neighbor LTE frequency or if the neighbor RAT frequency is a UTRAN FDD system, the procedure goes to step 3393. Otherwise if the corresponding neighbor frequency is not a neighbor LTE frequency or if the neighbor RAT frequency is not a UTRAN FDD system, the procedure goes to step 3396.

At step 3393, the UE determines whether the Squal of the neighbor LTE frequency/UTRAN FDD frequency cell is greater than the ThreshX,LowQ and the Squal of the current LTE frequency serving cell is less than the ThreshServing, LowQ during the Treselection timer period. If the Squal of the neighbor LTE frequency/UTRAN FDD frequency cell is greater than the ThreshX,LowQ and the Squal of the current LTE frequency serving cell is less than the ThreshServing, LowQ during the Treselection timer period, the procedure goes to step 3379. Otherwise if the conditions of step 3393 are not fulfilled, the UE remains in the current cell and ends the cell reselection procedure.

At step 3396, the UE determines whether the neighbor RAT frequency is a UTRAN TDD/GERAN/CDMA2000 system. If the neighbor RAT frequency is a UTRAN TDD/GERAN/CDMA2000 system, the procedure goes to step 3399. Otherwise if the neighbor RAT frequency is not a UTRAN TDD/GERAN/CDMA2000 system, this means an error has occurred and thus the UE performs an error handling operation.

At step 3399, the UE determines whether the Srxlev of the neighbor LTE frequency/UTRAN TDD/GERAN/CDMA2000 frequency cell is greater than the ThreshX, LowP and the Srxlev of the current LTE frequency serving cell is less than the ThreshServing,LowP during the Treselection timer period. If the Srxlev of the neighbor LTE frequency/UTRAN TDD/GERAN/CDMA2000 frequency cell is greater than the ThreshX,LowP and the Srxlev of the current LTE frequency serving cell is less than the Thresh-Serving,LowP during the Treselection timer period, the procedure goes to step 3379. Otherwise if the conditions of step 3399 are not fulfilled, the cell reselection to the neighbor LTE frequency/RAT frequency cell does not occurs.

In the 3GPP, discussions made of a frequency priority-based cell selection method for preventing the UE in the idle mode from reselecting specific frequency band or RAT when the corresponding frequency band or RAT undergoes congestion or the eNB undergoes processing overload.

Figure 17:
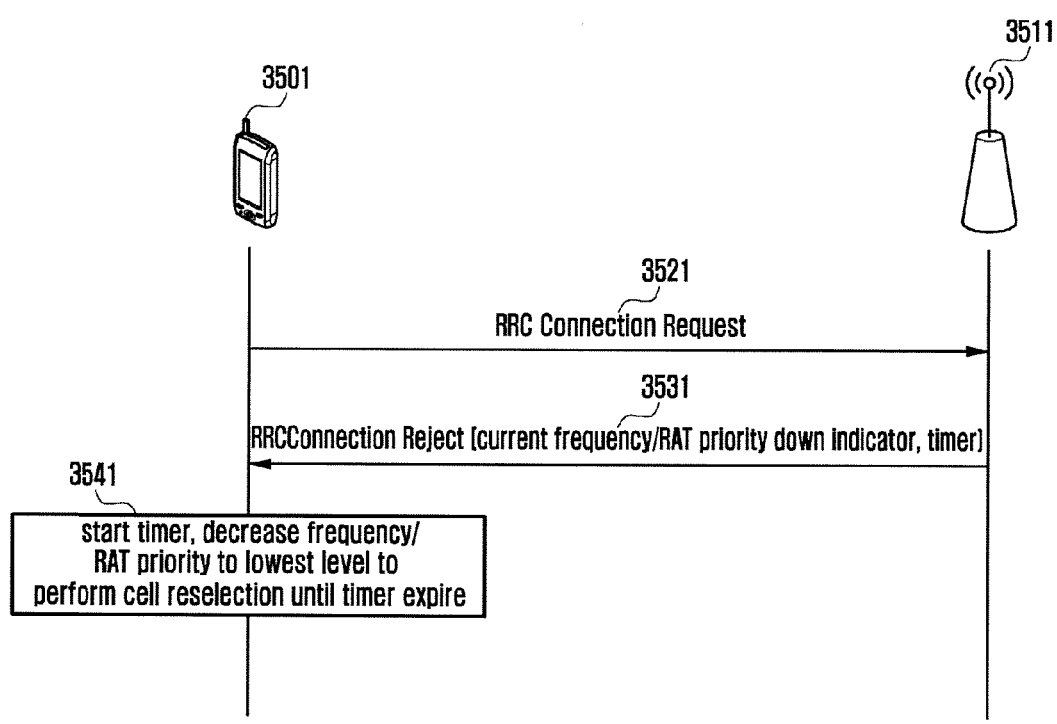
FIG. 17 is a signal flow diagram illustrating a de-prioritization procedure according to an embodiment of the present invention.

FIG. 17 is a signal flow diagram illustrating a de-prioritization procedure according to an embodiment of the present invention. In FIG. 17, the system includes a UE 3501 in the idle mode and an eNB 3511 which controls the cell on which the UE has camped.

The UE 3501 in the idle mode sends the eNB 3511 an RRC Connection Request message to establish an RRC connection with the eNB 3511 at step 3521. For example, if data transmission is required, the UE 3501 may try to establish an RRC connection.

Upon receipt of the RRC Connection Setup Request message at step 3521, the eNB 3511 determines the congestion level of the frequency band of the cell as well as the cell itself or the RAT of the cell (here, the current serving cell system is assumed as the LTE system). If the corresponding frequency band or the RAT is congested on the whole, the eNB 3511 sends the UE 3501 an RRC Connection Reject message. The RRC Connection Reject message includes a priority down indicator for lowering the priority of the current frequency and/or RAT and a timer for the validity of the indicator.

If the Connection Reject message is received, the UE 3501 starts the timer set to a predetermined value which is included in the Connection Reject message at step 3541. The UE 3501 decreases the priority value of the frequency and/or RAT to the lowest level (or a predetermined low value) to perform cell reselection until the timer expires. In FIG. 17, it is assumed that the timer value is signaled through the Connection Reject message. According to an alternative embodiment, no timer value is carried in the Connection Reject or other messages, but a predetermined value is used. By decreasing the priority of a specific frequency or RAT undergoing congestion under the control of the eNB, the UE 3501 which receives the signal performs cell reselection to access other frequency or RAT cell so as to overcome the cell/eNB congestion problem.

Figure 18:
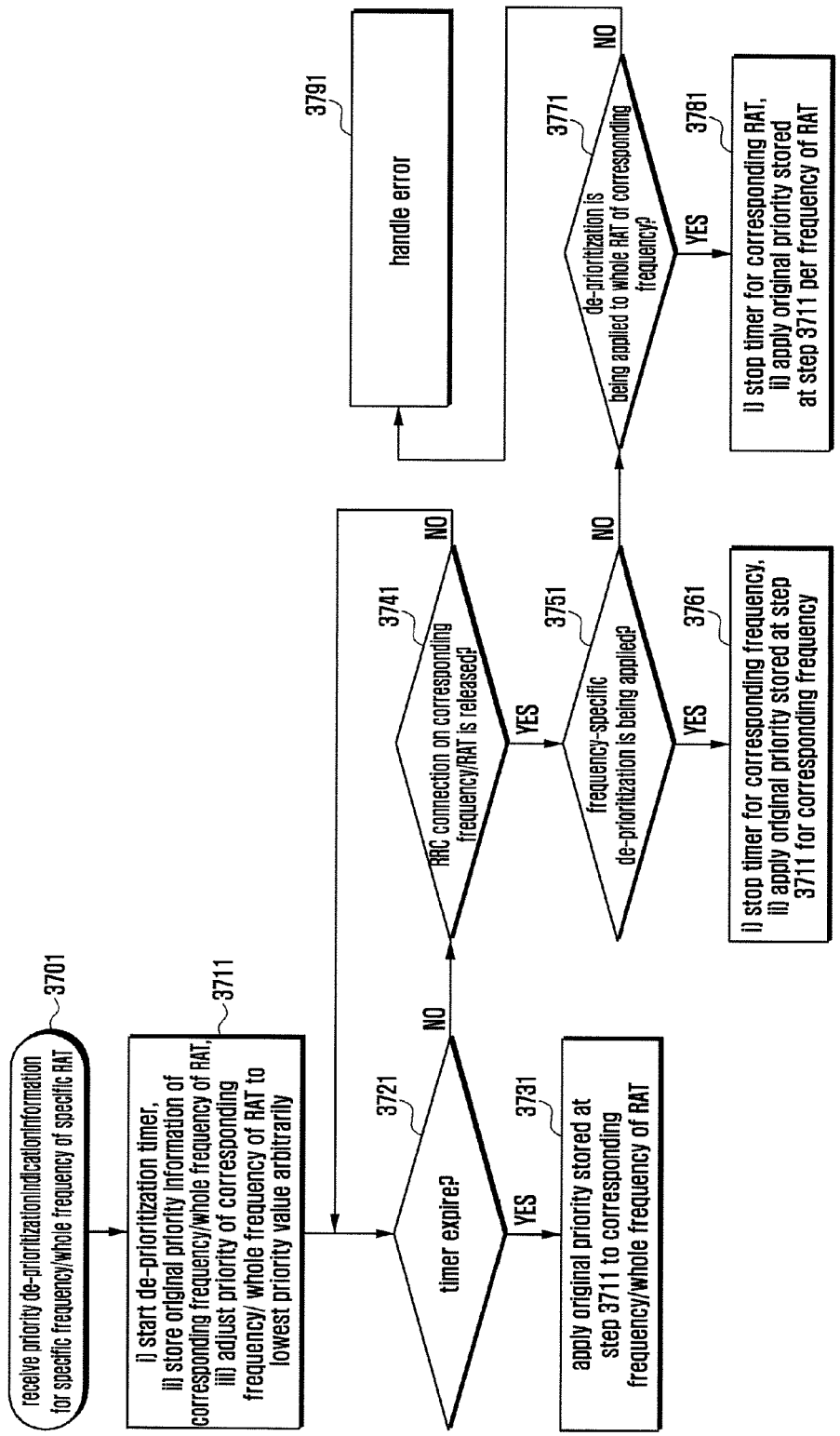
FIG. 18 is a flowchart illustrating a de-prioritization procedure according to another embodiment of the present invention.

FIG. 18 is a flowchart illustrating a de-prioritization procedure of the UE according to an embodiment of the present invention. The UE 305 receives the information indicating de-prioritization of the priority of a specific frequency (frequency of the cell in which the RRC Connection Reject message has been transmitted) or the whole frequency of the RAT of the corresponding cell through the RRC Connection Reject message at step 3701. The UE 3501 may inform the eNB 3511 whether to de-prioritize the current frequency or the whole frequency of the RAT which includes the current frequency.

If the priority De-Prioritization indication information is received, the UE 3501 starts the de-prioritization timer, stores the information on the original priority of the corresponding frequency and/or whole frequency of the corresponding RAT, and changes (adjusts) the priority of the corresponding frequency and/or the whole frequency of the corresponding RAT to the lowest priority (or a low value) arbitrarily at step 3711. Although the embodiment of FIG. 18 is directed to a case where the de-prioritization timer starts first at step 3711, the timer may start last at step 3711 in an alternative embodiment.

The UE determines whether the timer has expired at step 3721. If the timer has expired, the procedure goes to step 3731. At step 3731, the UE recovers the original priority value stored at step 3711 and applies the recovered priority to the corresponding frequency and/or the whole frequency of the RAT.

If the timer has not expired, the procedure goes to step 3741. At step 3741, the UE determines whether the RRC Connection is released on the corresponding frequency/RAT to which the priority de-prioritization is being applied. For example, it is such a case that the UE performs cell reselection to access another frequency/RAT cell and establish an RRC connection thereto due to the de-prioritization of the corresponding frequency/RAT but the network hands the UE over to corresponding frequency/RAT to which the priority de-prioritization is being applied and releases the RRC connection.

If the RRC connection to the corresponding frequency/RAT to which the priority de-prioritization is being applied is released at step 3741, the procedure goes to step 3751. Otherwise, the procedure goes back to step 3721 to determine whether the timer has expired. The UE 3501 determines whether the frequency de-prioritization is applied to a partial frequency band of the whole RAT frequency band at step 3751. If the frequency de-prioritization is applied to a partial frequency band of the whole RAT frequency band, the procedure goes to step 3761. At step 3761, the UE 3501 stops the de-prioritization timer for the corresponding frequency and applies/recovers the original priority value stored at step 3711 to the frequency. In the embodiment, it is assumed that the de-prioritization timer runs per frequency. If one timer is used for all frequencies, the de-prioritization timer stops only when it is applied to one frequency and, in other cases, the de-prioritization timer keeps running.

If the frequency de-prioritization is not applied to a partial frequency band of the whole RAT frequency band at step 3751, the procedure goes to step 3771. At step 3771, the UE 3501 determines whether the priority de-prioritization is being applied to the whole frequency of the RAT which includes the corresponding frequency. If the priority de-prioritization is being applied to the whole frequency of the RAT which includes the corresponding frequency, the procedure goes to step 3781. At step 3781, the UE 3501 stops the de-prioritization timer for the corresponding RAT and applies/recovers the original priority value stored per frequency of the RAT at step 3711.

If the priority de-prioritization is not being applied to the whole frequency of the RAT which includes the corresponding frequency, this means an erroneous situation and thus the procedure goes to step 3791. If the per-frequency priority information stored at step 3711 does not include the whole frequency of the RAT, this is also an erroneous situation and thus the procedure goes to step 3791. At step 3791, the UE 3501 perform error handling process on the unexpected error.

Figure 10:
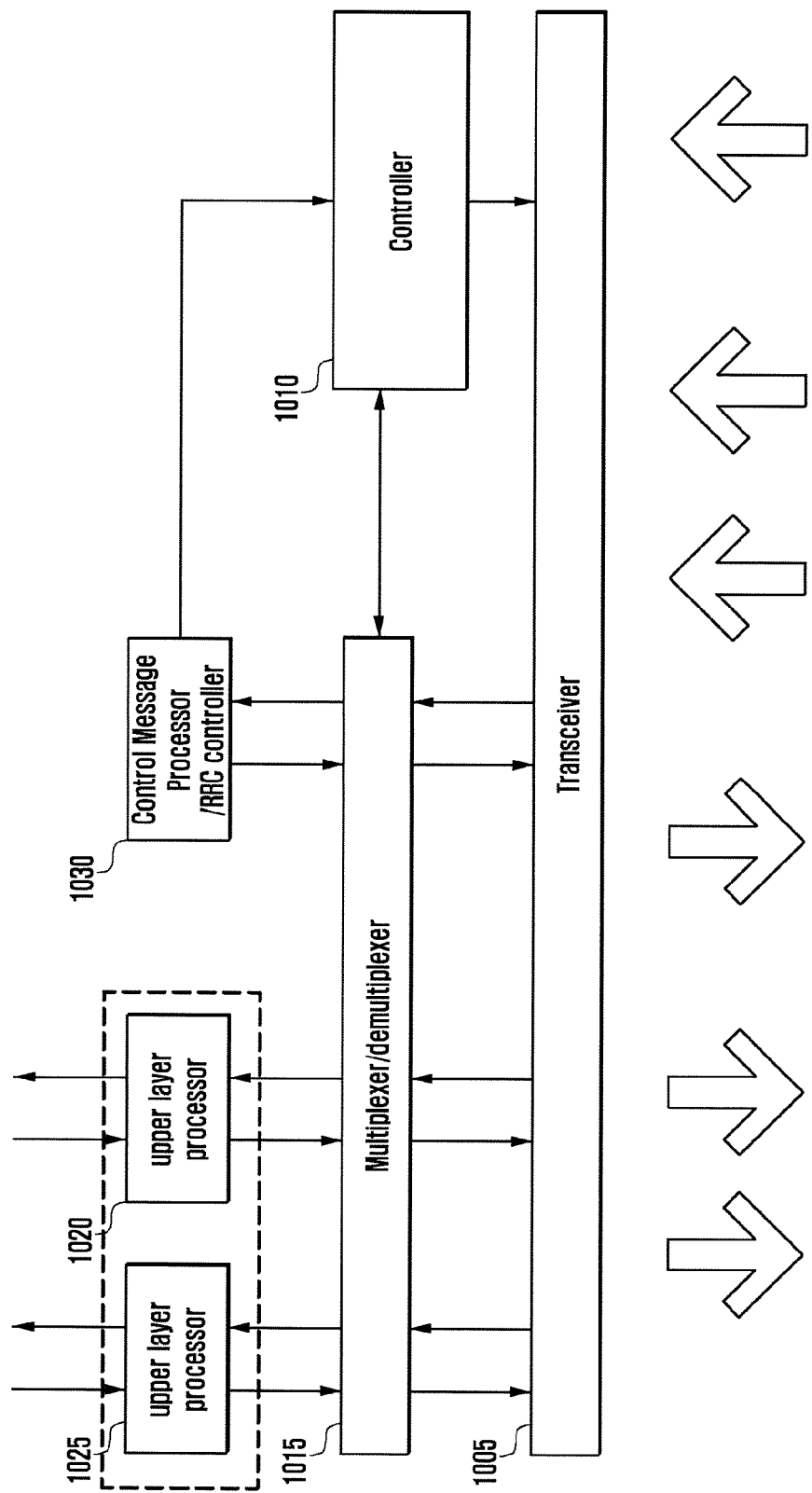
FIG. 10 is a block diagram illustrating a UE.

FIG. 10 is block diagram illustrating a configuration of the UE according to an embodiment of the present invention.

As shown in FIG. 10, the UE according to an embodiment of the present invention includes a transceiver 1005, a controller 1010, a multiplexer/demultiplexer 1015, a control message processor/RRC controller 1035, and upper layer processor 1020 and 1025.

The transceiver 1005 is responsible for receiving data and predetermined control signal through a downlink channel of the serving cell and transmitting data and predetermined control signals through an uplink channel. In the case that a plurality of serving cells is configured, the transceiver 1005 transmits and receives data and control signals through the plural serving cells.

The multiplexer/demultiplexer 1015 is responsible for multiplexing data generated by the upper layer processors 1020 and 1025 and the control message processor 1030 or demultiplexing data received by the transceiver 1005 to deliver the demultiplexed data to the upper layer processors 1020 and 1025 and the control message processor 1030.

The control message processor 1030 processes the control message received from the eNB and takes a necessary action.

The upper layer processor 1020 and 1025 is established per service. The upper layer processors 1020 and 10250 process the data generated in the user service such as File Transfer Protocol (FPT) and Voice over Internet Protocol (VoIP) and transfers the processed data to the multiplexer/demultiplexer 1015 or processes the data from the multiplexer/demultiplexer 1015 and delivers the processed data to the upper layer service applications.

The controller 1010 checks the scheduling command, e.g. uplink grants, received through the transceiver 1005 and controls the transceiver 1005 and the multiplexer/demultiplexer 1015 to perform uplink transmission with appropriate transmission resource at an appropriate timing.

Figure 11:
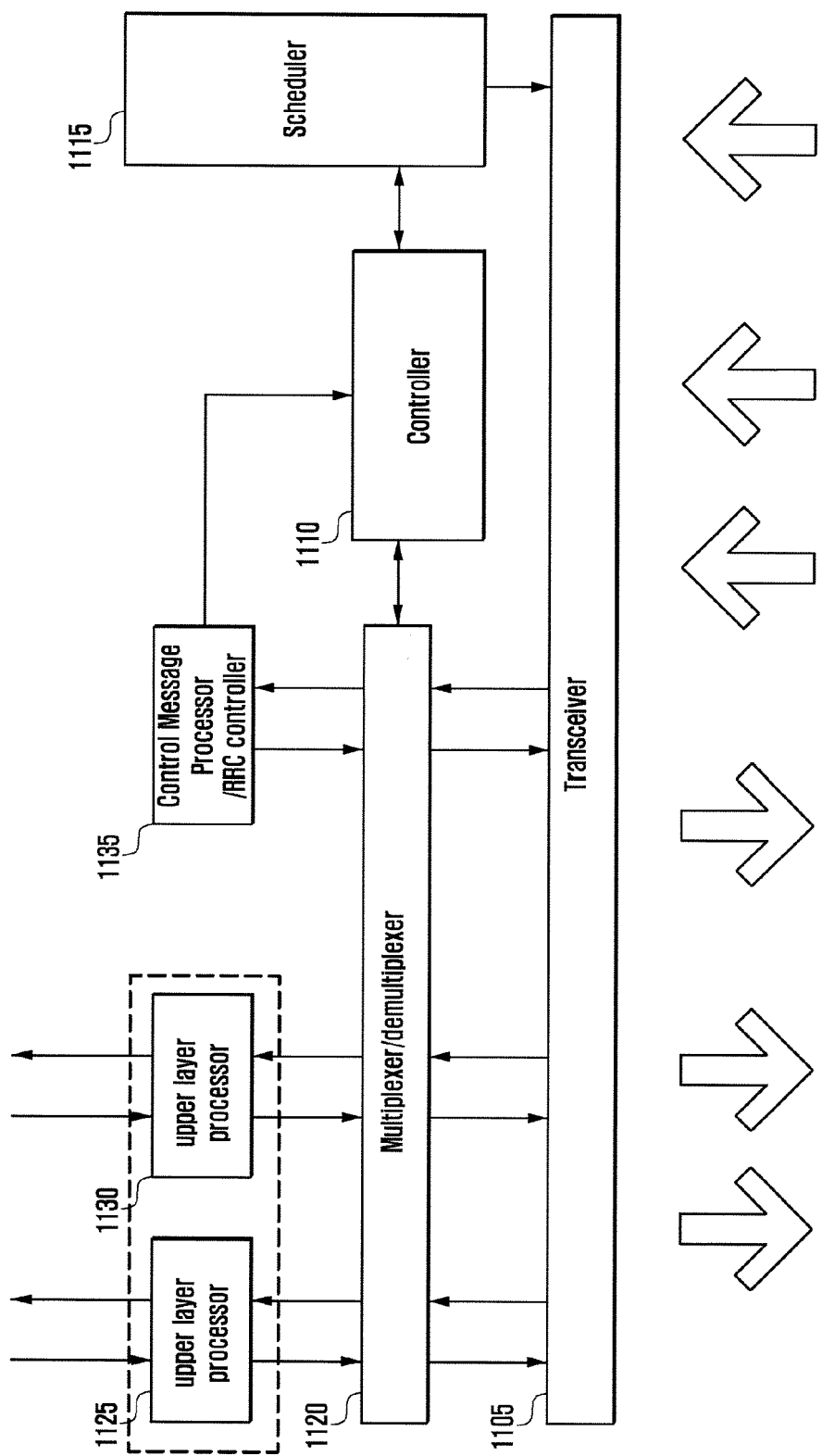
FIG. 11 is a block diagram illustrating a base station.

FIG. 11 is a block diagram illustrating a configuration an eNB according to an embodiment of the present invention, and the eNB includes a transceiver 1105, a controller 1110, a multiplexer/demultiplexer 1120, a control message processor/RRC controller 1135, upper layer processors 1125 and 1130.

The transceiver 1105 is responsible for transmitting data and predetermined control signal through a downlink channel and receiving data and predetermined control signals through an uplink channel. In the case that a plurality of carriers is configured, the transceiver 1105 transmits and receives data and control signals through the plural carriers.

The multiplexer/demultiplexer 1120 is responsible for multiplexing data generated by the upper layer processors 1125 and 1130 and the control message processor/RRC controller 1135 or demultiplexing data received by the transceiver 1105 to deliver the demultiplexed data to the upper layer processors 1125 and 1130, the control message processor/RRC controller 1135, and the controller 1110. The control message processor/RRC controller 1135 processes the control message transmitted by the UE to take a necessary action or generates a control message addressed to the UE to the lower layer.

The upper layer processor 1125 (or 1130) is established per service, processes the data to be transmitted to the S-GW or another eNB into RLC PDU and transfers the RLC PDU to the multiplexer/demultiplexer 1120, and processes the RLC PDU from the multiplexer/demultiplexer 1120 into PDCP SDU to be transmitted to the S-GW or another eNB.

The scheduler 1115 allocates transmission resource to the UE at an appropriate timing in consideration of the buffer state and channel condition of the UE and processes the signal transmitted form the UE or to be transmitted to the UE by means of the transceiver 1105.

The controller 1110 controls the transceiver 1105 to receive the channel state information transmitted by the UE.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a terminal in a mobile communication system, the method comprising:
   receiving, from a base station, a request message related to a capability of the terminal;
   generating a response message based on the request message, the response message including first information on a list of a supported band combination for the terminal and second information comprised of 1 bit information indicating whether a multiple timing advance is supported for each band combination listed in the first information; and
   transmitting, to the base station, the response message,
   wherein if the supported band combination for the terminal is comprised of an intra-band contiguous band combination, the second information indicates whether different timing advances across component carriers of the supported band combination are supported, and
   wherein if the supported band combination for the terminal is comprised of an inter-band band combination or an intra-band non-contiguous band combination, the second information indicates whether different timing advances on different band entries of the supported band combination are supported.

2. The method of claim 1, wherein the generating a response message includes:
   identifying whether the request message includes information related to evolved universal terrestrial radio access (EUTRA); and
   generating, when the request message includes the information, the response message including the second information.

3. A method by a base station in a mobile communication system, the method comprising:

transmitting, to a terminal, a request message related to a capability of the terminal; and receiving, from the terminal, a response message generated based on the request message, the response message including first information on a list of a supported band combination for the terminal and second information comprised of 1 bit information indicating whether a multiple timing advance is supported for each band combination listed in the first information, wherein if the supported band combination for the terminal is comprised of an intra-band contiguous band combination, the second information indicates whether different timing advances across component carriers of the supported band combination are supported, and wherein if the supported band combination for the terminal is comprised of an inter-band band combination or an intra-band non-contiguous band combination, the second information indicates whether different timing advances on different band entries of the supported band combination are supported.

4. The method of claim 3, wherein the response message including the second information is generated, when the request message includes information related to evolved universal terrestrial radio access (EUTRA).

5. A terminal in a mobile communication system, the terminal comprising:
a transceiver configured to transmit and receive a signal; and
a controller coupled with the transceiver configured to:
control the transceiver to receive, from a base station, a request message related to a capability of the terminal,
generate a response message based on the request message, the response message including first information on a list of a supported band combination for the terminal and second information comprised of 1 bit information indicating whether a multiple timing advance is supported for each band combination listed in the first information, and
control the transceiver to transmit, to the base station, the response message, wherein if the supported band combination for the terminal is comprised of an intra-band contiguous band combination, the second information indicates whether different timing advances across component carriers of the supported band combination are supported, and wherein if the supported band combination for the terminal is comprised of an inter-band band combination or an intra-band non-contiguous band combination, the second information indicates whether different timing advances on different band entries of the supported band combination are supported.

6. The terminal of claim 5, wherein the controller is further configured to:
identify whether the request message includes information related to evolved universal terrestrial radio access (EUTRA), and
generate, when the request message includes the information, the response message including the second information.

7. A base station in a mobile communication system, the base station comprising:
a transceiver configured to transmit and receive a signal; and
a controller coupled with the transceiver and configured to:
transmit, to a terminal, a request message related to a capability of the terminal, and
receive, from the terminal, a response message generated based on the request message, the response message including first information on a list of a supported band combination for the terminal and second information comprised of 1 bit information indicating whether a multiple timing advance is supported for each band combination listed in the first information, wherein if the supported band combination for the terminal is comprised of an intra-band contiguous band combination, the second information indicates whether different timing advances across component carriers of the supported band combination, and wherein if the supported band combination for the terminal is comprised of an inter-band band combination or an intra-band non-contiguous band combination, the second information indicates whether different timing advances on different band entries of the supported band combination are supported.

8. The base station of claim 7, wherein the response message including the second information is generated, when the request message includes information related to evolved universal terrestrial radio access (EUTRA).

* * * * *